United States Patent
Ranjan et al.

(10) Patent No.: US 11,749,272 B2
(45) Date of Patent: *Sep. 5, 2023

(54) VOICE-BASED TIME-SENSITIVE TASK PROCESSING OVER A HIGH GENERATION CELLULAR NETWORK

(71) Applicant: Bank of America Corporation, Charlotte, NC (US)

(72) Inventors: Prabhat Ranjan, Plano, TX (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/237,281

(22) Filed: Apr. 22, 2021

(65) Prior Publication Data

US 2021/0241770 A1 Aug. 5, 2021

Related U.S. Application Data

(63) Continuation of application No. 16/505,939, filed on Jul. 9, 2019, now Pat. No. 11,017,773.

(51) Int. Cl.
*G10L 15/22* (2006.01)
*G10L 17/22* (2013.01)
(Continued)

(52) U.S. Cl.
CPC .............. *G10L 15/22* (2013.01); *G10L 17/00* (2013.01); *G10L 17/22* (2013.01);
(Continued)

(58) Field of Classification Search
CPC ... G10L 15/22; G10L 17/22; G10L 2015/223; G10L 2015/227; G10L 15/26; G10L 15/30
See application file for complete search history.

(56) References Cited

U.S. PATENT DOCUMENTS 9,788,211 B2 10/2017 Zhang
9,858,925 B2 1/2018 Gruber et al.
(Continued)

*Primary Examiner* — Abul K Azad
(74) *Attorney, Agent, or Firm* — Banner & Witcoff, Ltd.

(57) ABSTRACT

Aspects of the disclosure relate to voice-based time-sensitive task processing over a high generation cellular network. A computing platform may establish a communication channel with a computing device. The computing platform may authenticate a user of the computing device, where the user is authorized to access the enterprise server. Then, the computing platform may detect, via the communication interface, a voice-based interaction from the authenticated user. The computing platform may cause the voice-based interaction to be captured as audio data. Subsequently, the computing platform may transform the audio data to textual data. The computing platform may analyze the textual data to identify a time-sensitive task related to an entity. Then, the computing platform may generate, based on the identified time-sensitive task, one or more instructions to execute the time-sensitive task. Subsequently, the computing platform may send, to an enterprise server, the one or more instructions to execute the time-sensitive task.

20 Claims, 10 Drawing Sheets

(51) Int. Cl.
*G10L 17/00* (2013.01)
*H04W 12/065* (2021.01)

(52) U.S. Cl.
CPC ..... *H04W 12/065* (2021.01); *G10L 2015/223* (2013.01); *G10L 2015/227* (2013.01)

(56) References Cited

U.S. PATENT DOCUMENTS

| | | |
|---|---|---|
| 9,935,904 B2 | 4/2018 | Sharma et al. |
| 9,961,624 B1 | 5/2018 | Zait |
| 10,257,668 B2 | 4/2019 | Shaw et al. |
| 11,017,773 B2 * | 5/2021 | Ranjan ................. H04W 12/66 |
| 11,133,929 B1 * | 9/2021 | Shahidzadeh ......... H04L 9/0891 |
| 11,521,609 B2 * | 12/2022 | Yamamoto .............. G10L 17/22 |
| 2008/0140688 A1 | 6/2008 | Clayton et al. |
| 2013/0155808 A1 | 6/2013 | L'Her et al. |
| 2013/0268427 A1 | 10/2013 | Kligman et al. |
| 2015/0269672 A1 | 9/2015 | Bhuyan |
| 2016/0335532 A1 | 11/2016 | Sanghavi et al. |
| 2017/0193422 A1 | 7/2017 | Frieden et al. |
| 2020/0120396 A1 * | 4/2020 | Jamal ................. H04N 21/4825 |
| 2020/0401370 A1 | 12/2020 | Shetty et al. |

* cited by examiner

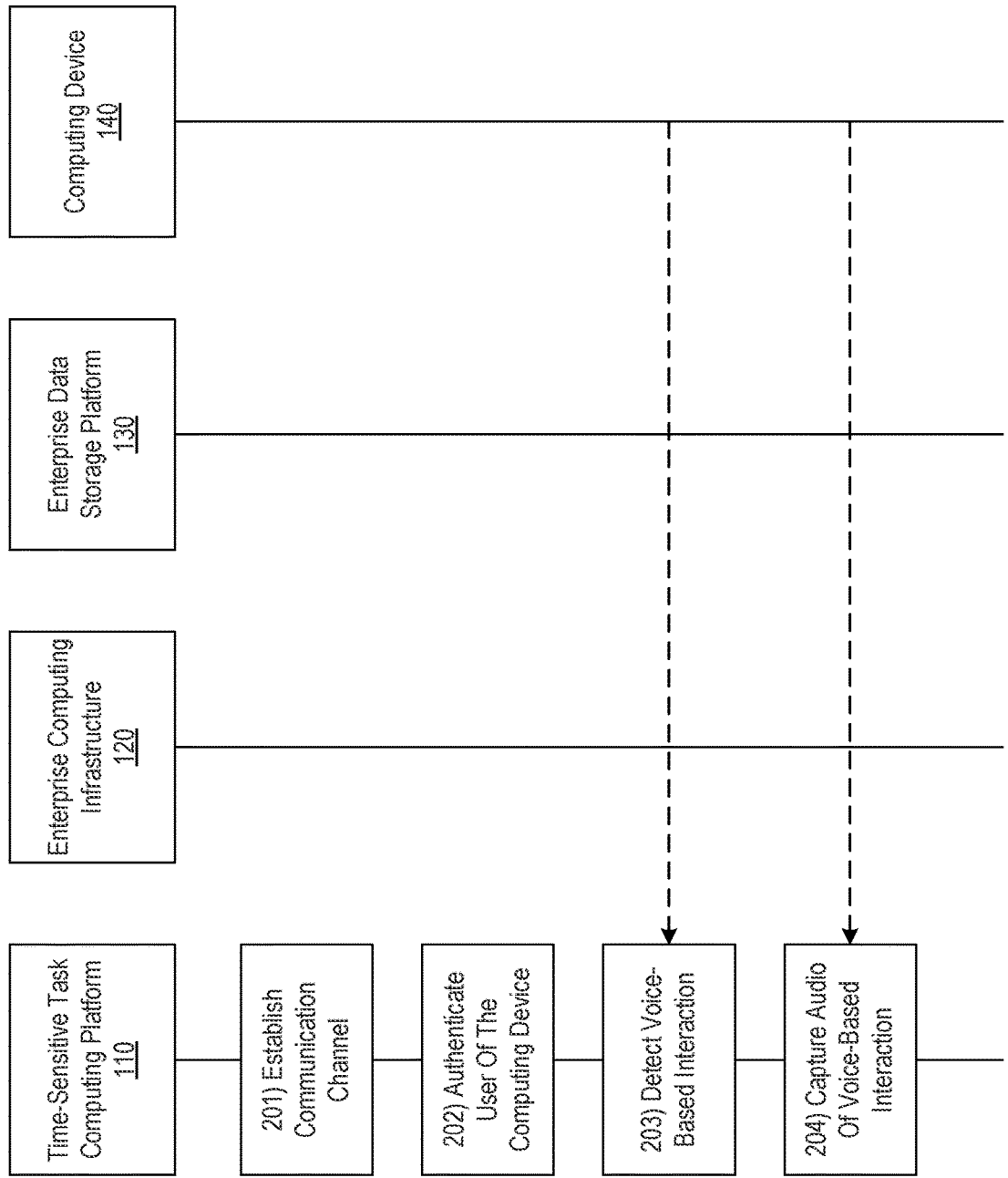

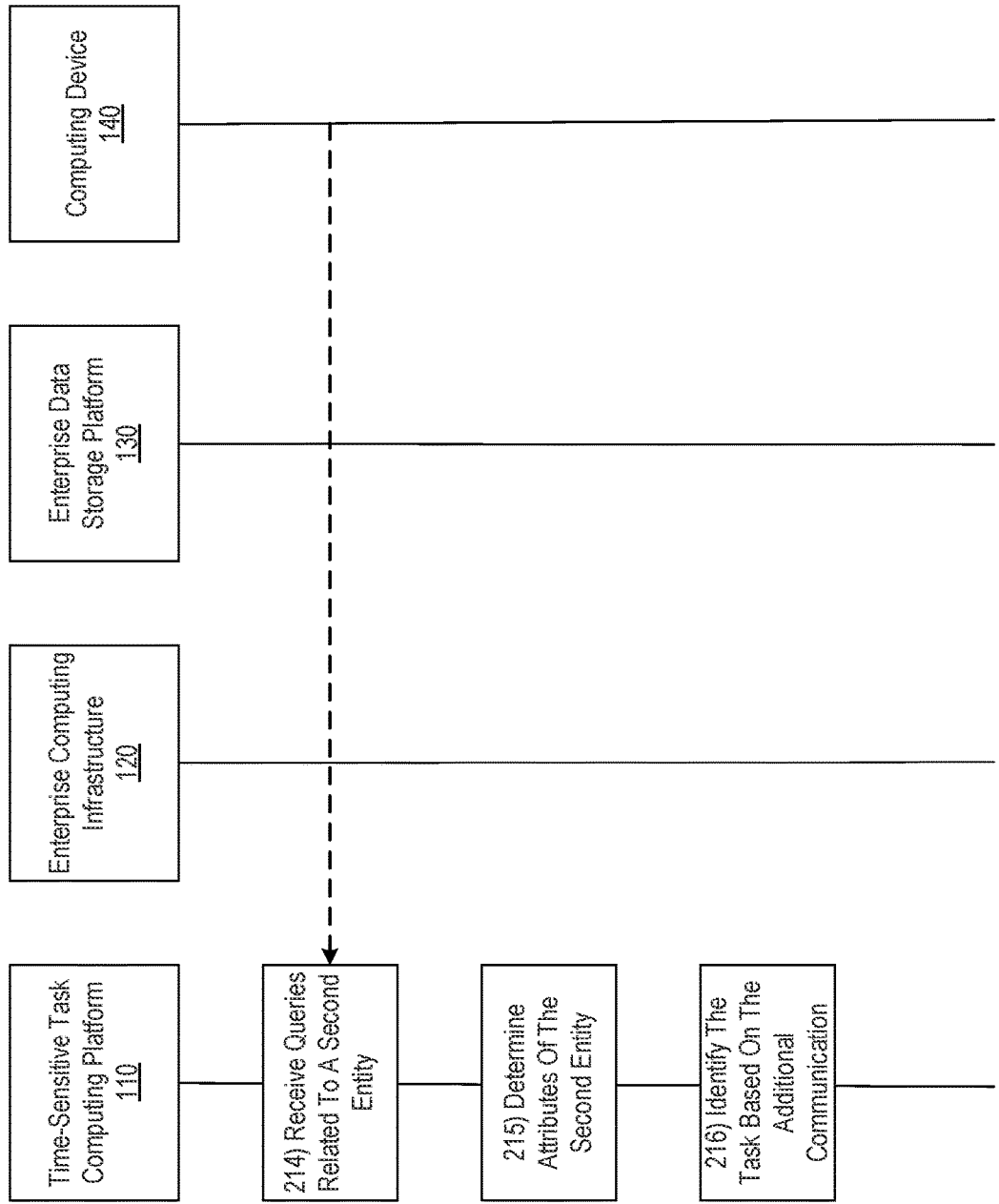

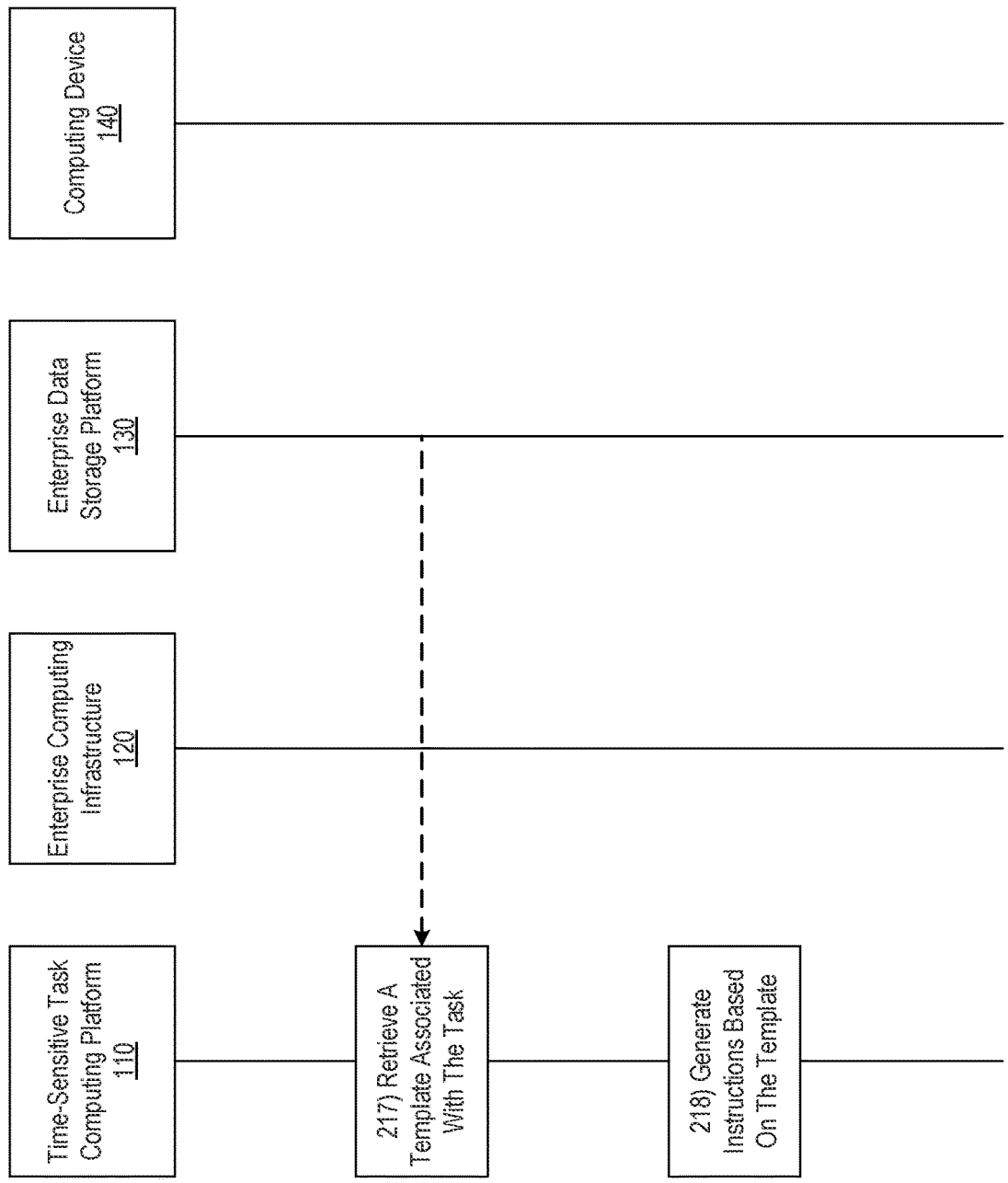

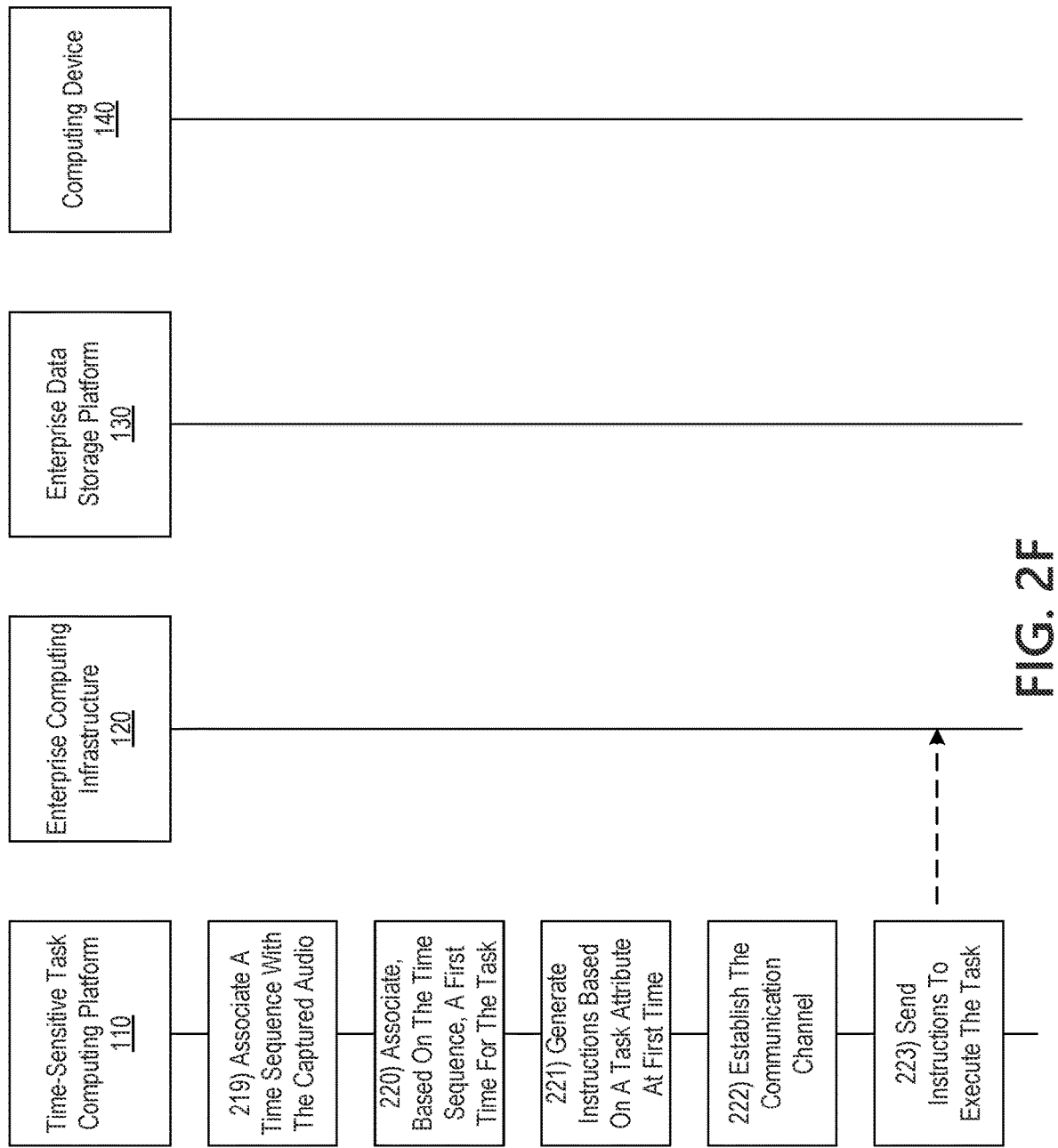

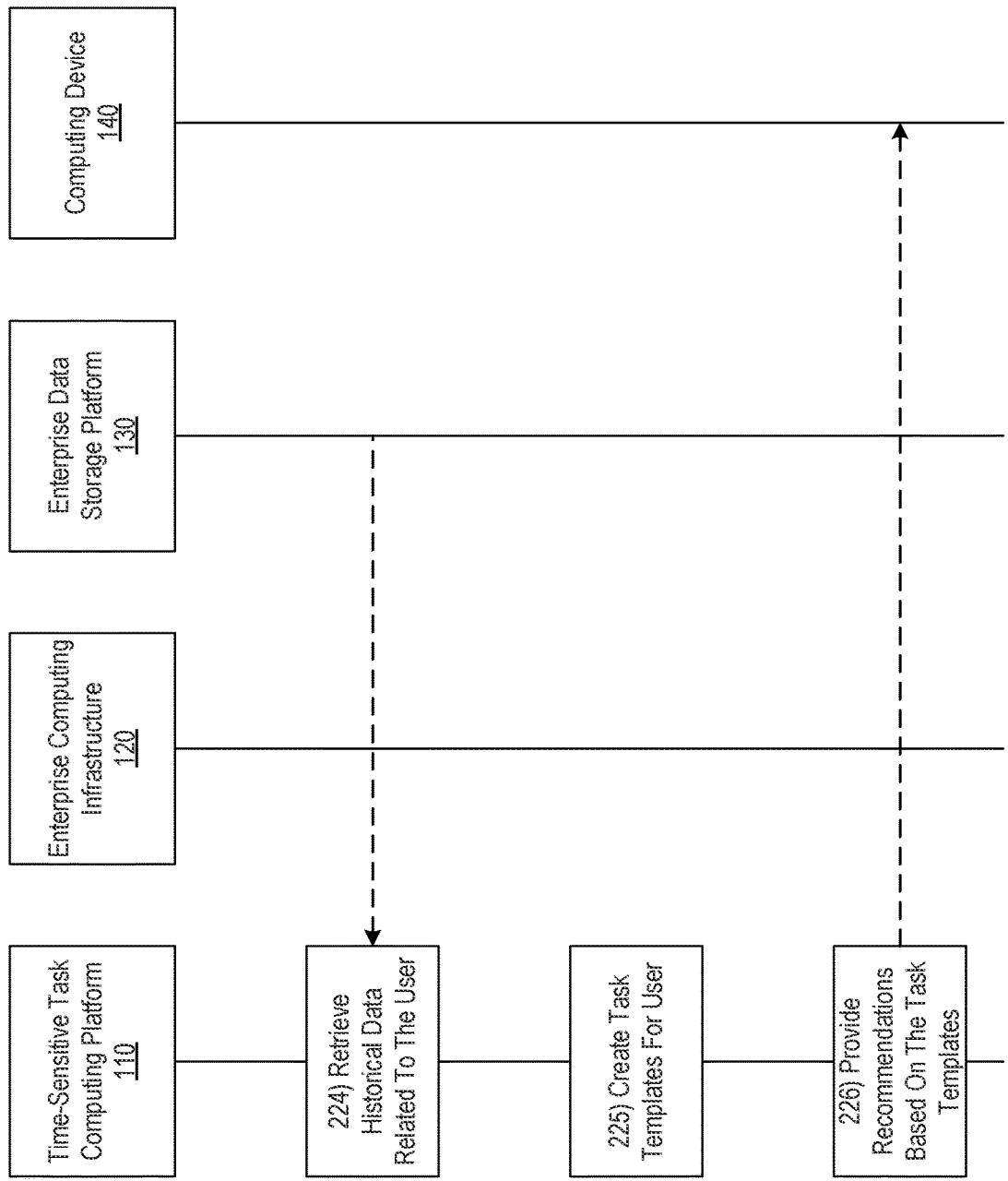

VOICE-BASED TIME-SENSITIVE TASK PROCESSING OVER A HIGH GENERATION CELLULAR NETWORK

CROSS REFERENCE TO RELATED APPLICATION

This patent application is a continuation of U.S. patent application Ser. No. 16/505,939 filed Jul. 9, 2019 entitled "VOICE-BASED TIME-SENSITIVE TASK PROCESSING OVER A HIGH GENERATION CELLULAR NETWORK." This application claims priority to and the benefit of the above-identified application which is fully incorporated by reference herein in its entirety BACKGROUND Aspects of the disclosure relate to deploying digital data processing systems to real-time processing of audio and textual data to identify and execute tasks in an enterprise system. In particular, one or more aspects of the disclosure relate to voice-based time-sensitive task processing over a high generation cellular network.

Enterprise organizations may utilize various computing infrastructure to identify tasks requested by their customers and execute the tasks with speed and accuracy. Such tasks may be time-sensitive and may need to be performed in real-time. In some instances, the tasks may include confidential information and/or other sensitive data that is created, transmitted, and/or used for various purposes. In some instances, processing a task may include processing voice-based interactions to identify a task, respond to queries, and then execute the task. Large amounts of sensitive data and confidential information may need to be generated, transmitted, and/or used for various purposes. In some instances, processing such tasks may involve access to customer information over various networks and/or between various computer systems. Ensuring authenticity of a device associated with a task when accessing such data, being able to process voice-based communications to identify and execute the task in real time with speed and accuracy, may be critically important to completion of the task, while also protecting the integrity and confidentiality of the underlying information. In many instances, however, it may be difficult to process, identify and execute such tasks with speed and accuracy while also attempting to optimize network resources, speech-to-text processing, bandwidth utilization, and efficient operations of the computing infrastructure involved in maintaining, accessing, and executing the task.

SUMMARY

Aspects of the disclosure provide effective, efficient, scalable, fast, reliable, and convenient technical solutions that address and overcome the technical problems associated with voice-based task processing in real time, by utilizing a high generation cellular network.

In accordance with one or more embodiments, a computing platform having at least one processor, a communication interface, and memory may establish, via the communication interface, a communication channel between a computing device and an enterprise server. Subsequently, the computing platform may authenticate a user of the computing device, where the user is authorized to access the enterprise server. Then, the computing platform may detect, via the communication interface, a voice-based interaction from the authenticated user. Then, the computing platform may cause, via the communication interface, the voice-based interaction to be captured as audio data. Subsequently, the computing platform may transform the audio data to textual data. Then, the computing platform may analyze the textual data to identify a time-sensitive task related to an entity. Then, the computing platform may generate, based on the identified time-sensitive task, one or more instructions to execute the time-sensitive task. Subsequently, the computing platform may send, to the enterprise server and via the communication channel, the one or more instructions to execute the time-sensitive task.

In some embodiments, the computing platform may identify, in the textual data, one or more queries related to the entity. Then, the computing platform may determine a response to the one or more queries related to the entity. Then, the computing platform may cause the computing device to provide, via the communication interface, the response to the user. Subsequently, the computing platform may receive, based on the response and via the communication interface, an additional communication from the user, where identifying the time-sensitive task is based on the additional communication.

In some embodiments, the computing platform may receive, from the user via the communication interface, one or more queries related to a second entity. Then, the computing platform may determine, based on the one or more queries, one or more attributes of the second entity, where identifying the time-sensitive task related to the entity is based on the one or more attributes of the second entity.

In some embodiments, the computing platform may retrieve, from a repository of user data, a template associated with the time-sensitive task, where generating the one or more instructions is based on the identified template.

In some embodiments, the computing device may be an on-board computing device of a vehicle. In some embodiments, the communication interface may be an on-board graphical user interface associated with the on-board computing device of the vehicle.

In some embodiments, the communication channel may be established over a fifth-generation cellular network.

In some embodiments, the voice-based interaction may be detected prior to establishing the communication channel, and the computing platform may associate a time sequence with the captured audio data. Then, the computing platform may associate, based on the time sequence, the identified time-sensitive task with a first time. Subsequently, the computing platform may generate the one or more instructions to execute the time-sensitive task based on a task attribute at the first time. Then, the computing platform may send, upon establishing the communication channel with the computing device after the first time, the one or more instructions to execute the task.

In some embodiments, the computing platform may retrieve, from a repository of user data, historical data related to the user. Then, the computing platform may create, based on machine learning techniques applied to the historical data, one or more task templates associated with the user. Subsequently, the computing platform may provide, based on the one or more task templates and via the communication interface, one or more task recommendations to the user. In some embodiments, providing the one or more task recommendations to the user may occur prior to detecting the voice-based interaction from the authenticated user.

In some embodiments, authenticating the user may be based on one or more of biometric identifiers associated with the user.

In some embodiments, authenticating the user may be based on one or more of behavioral identifiers associated with the user.

In some embodiments, authenticating the user may be based on a location data of the computing device, wherein the location data is based on a high generation cellular network.

In some embodiments, authenticating the user may be based on a confidence level associated with the computing device. In some embodiments, the confidence level may be based on a knowledge of a second communication channel established between the computing device and a trusted device associated with the user.

In some embodiments, authenticating the user may occur at periodic intervals of time.

In some embodiments, the computing platform may determine, based on location data, a level of privacy between the user and the computing device. Then, the computing platform may establish, based on the level of privacy, a second communication channel between the enterprise server and a second computing device associated with the user.

In some embodiments, transforming the audio data to the textual data may be based on a trained machine learning model personalized for the user of the computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for voice-based time-sensitive task processing over a high generation cellular network in accordance with one or more example embodiments.

DETAILED DESCRIPTION

Figure 1A:
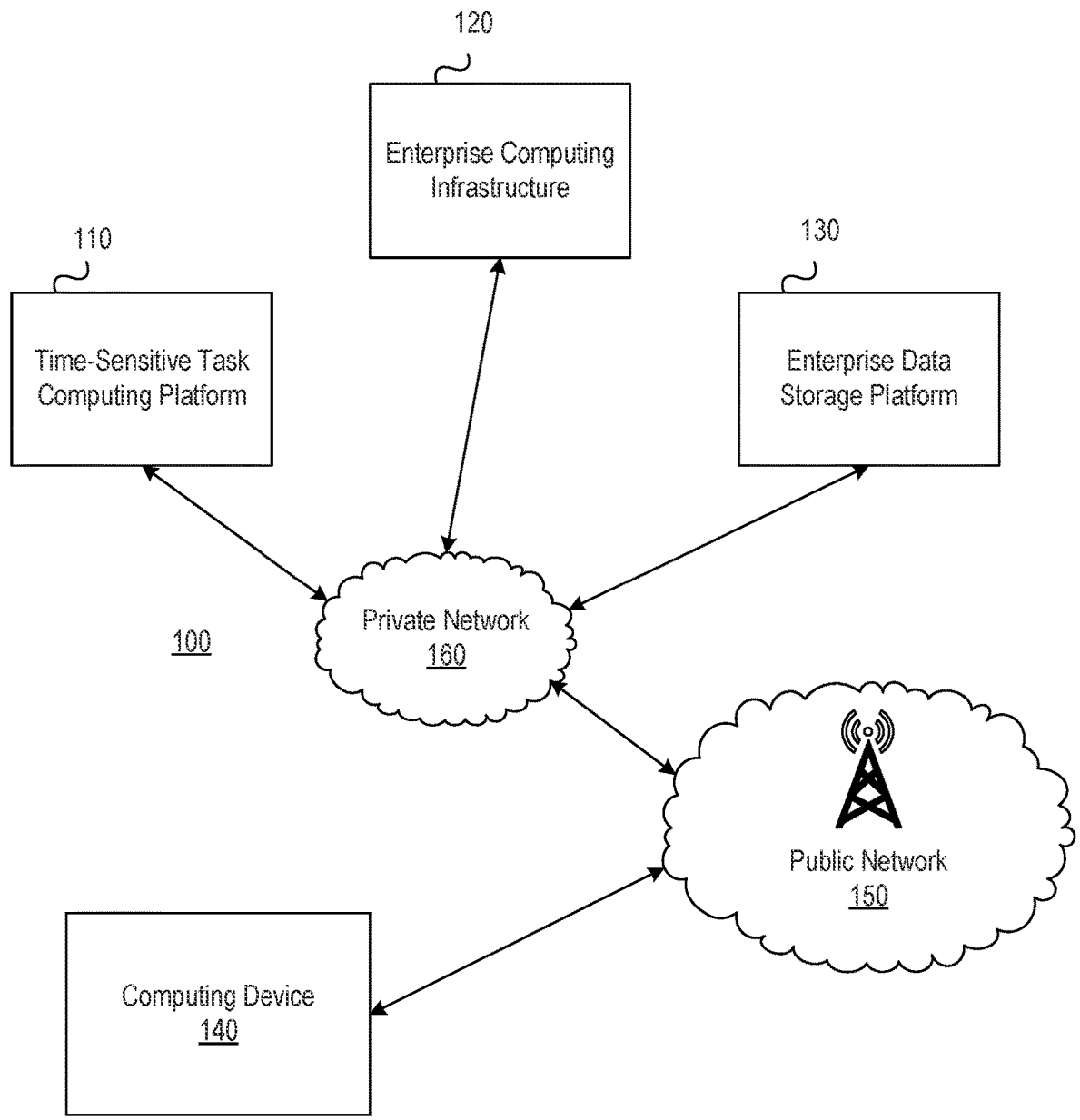
FIGS. 1A and 1B depict an illustrative computing environment for voice-based time-sensitive task processing over a high generation cellular network in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to voice-based time-sensitive task processing over a high generation cellular network. For example, a computing device may detect voice-based interactions from a user, establish a real-time communication channel with an enterprise server, use speech-to-text processing to identify a time-sensitive task, and then process the task. As another example, the voice-based time-sensitive task processing may occur via an on-board computing device (e.g., in a moving vehicle). Fast data transmission rates, efficient and reliable hand-over between transmission towers in cellular networks (e.g., as the vehicle continues to move), availability of bandwidth, accuracy of location data, and availability of multiple simultaneous communication channels are key to processing the time-sensitive task.

Cellular networks are generally associated with service areas that are subdivided into cells. Location data for devices are based on the cell within which the device is located. Accordingly, smaller cells provide greater accuracy and reliability of location data. High generation cellular networks, such as a fifth generation ("5G") cellular network, may be configured to considerably reduce the cell size, thereby improving accuracy of location data. Also, for example, in high generation cellular networks, each cell may be equipped with multiple antennas configured to communicate with the device within the cell so that multiple streams of data may be simultaneously transmitted, thereby increasing data transmission rates, reducing backlog due to network traffic, and enhancing speed and accuracy of communications.

In some instances, when a computing device (e.g., an on-board computing device in a vehicle) interacts with a user (e.g., a bank customer) via voice-based communications, a computing platform may be able to identify time-sensitive tasks from the voice-based communications, and generate instructions to execute the tasks in real-time. Authenticating the device and/or the user may be key to ensuring information security and confidentiality of the tasks. Location accuracy may be utilized to authenticate the device. Also, key is the ability to establish and maintain a reliable communication channel between the computing device and an enterprise server. When a time-sensitive task (e.g., trading a financial asset associated with an entity) has to be identified, processed and executed in real-time based on voice-based interactions with a mobile device (e.g., a computing device in a moving vehicle), high-speed data transmission rates, increased bandwidth, greater location accuracy, and low latency may be critical to process the task with speed and accuracy, while maintaining the integrity and confidentiality of the underlying data.

Figure 1B:
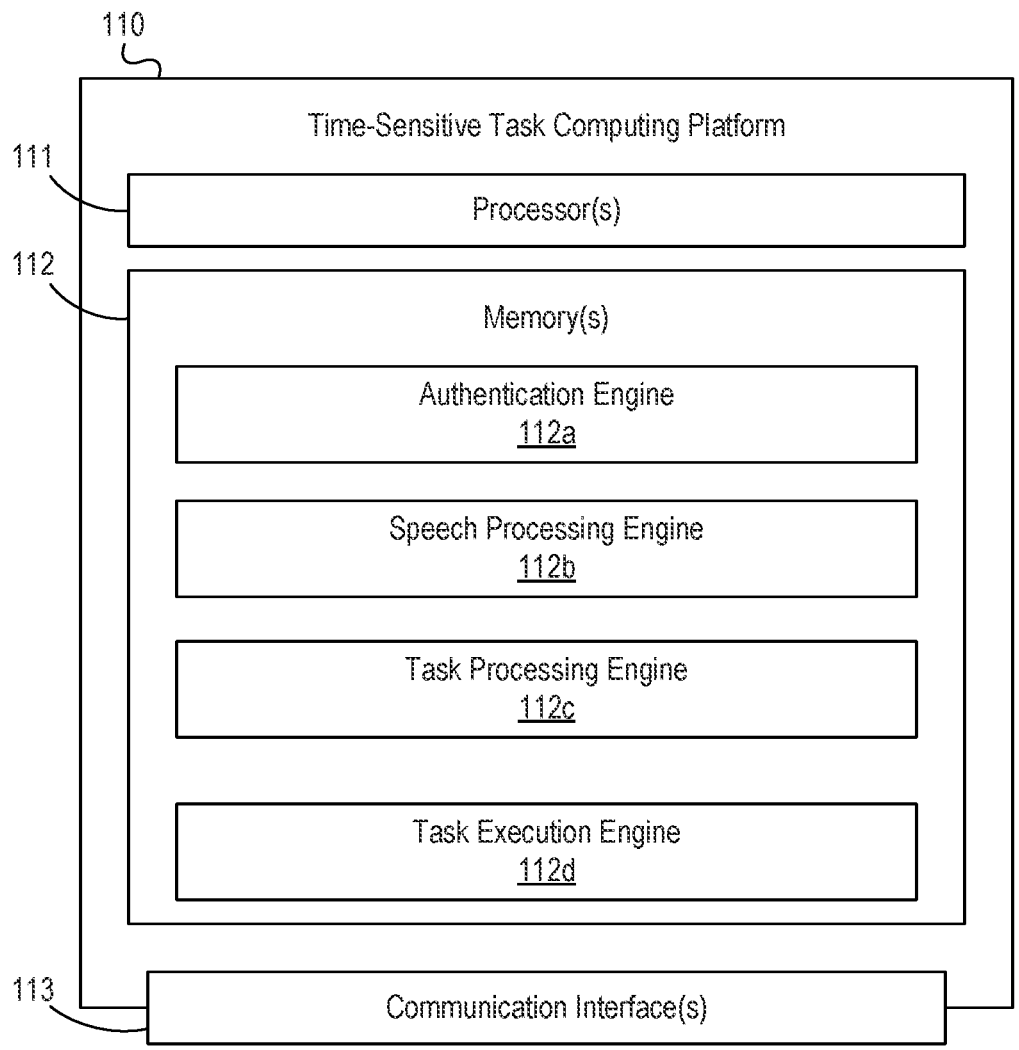

FIGS. 1A and 1B depict an illustrative computing environment for voice-based time-sensitive task processing over a high generation cellular network in accordance with one or more example embodiments. Referring to FIG. 1A, computing environment 100 may include one or more computer systems. For example, computing environment 100 may include time-sensitive task computing platform 110, enterprise computing infrastructure 120, enterprise data storage platform 130, and computing device 140.

As illustrated in greater detail below, time-sensitive task computing platform 110 may include one or more computing devices configured to perform one or more of the functions described herein. For example, time-sensitive task computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more speech processing programs, machine learning models, an enterprise mobile application for user devices, and/or other programs associated with an enterprise server, such as a trading platform. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, trade history, market share information, trading portfolios, a trading platform, tax related documents and information, and/or other information. In addition, enterprise computing infrastructure 120 may process and/or otherwise execute tasks on specific accounts based on commands and/or other information received from other computer systems included in computing environment 100. Additionally, or alternatively, enterprise computing infrastructure 120 may receive instructions from time-sensitive task computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally, or alternatively, enterprise computing infrastructure 120 may be configured to store and/or otherwise maintain user data. For example, enterprise computing infrastructure 120 may be configured to store and/or otherwise maintain task templates associated with users, historical data related to users, biometric identifiers associated with users, behavioral identifiers associated with users, location data of computing devices, and so forth. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Computing device 140 may be an on-board computing device in a vehicle configured for voice-based communications, or a personal computing device (e.g., desktop computer, laptop computer) or mobile computing device (e.g., smartphone, tablet, wearable device). In addition, computing device 140 may be linked to and/or used by a specific user (who may, e.g., be a customer of a financial institution or other organization operating time-sensitive task computing platform 110). Also, for example, a user of computing device 140 may use computing device 140 to perform financial transactions (e.g., trade financial assets for a publicly-traded corporate entity). For example, in some embodiments, the user of computing device 140 (e.g., on-board computing device in a vehicle configured for voice-based communications) may perform real-time financial transactions via voice-based interactions with a communication interface in a moving vehicle.

Computing environment 100 also may include one or more networks, which may interconnect one or more of time-sensitive task computing platform 110, enterprise computing infrastructure 120, enterprise data storage platform 130, and computing device 140. For example, computing environment 100 may include private network 160 (which may interconnect, for example, time-sensitive task computing platform 110, enterprise computing infrastructure 120, enterprise data storage platform 130, and/or one or more other systems which may be associated with an organization, such as a financial institution) and public network 150 (which may, e.g., interconnect computing device 140 with private network 160 and/or one or more other systems, public networks, sub-networks, and/or the like). Public network 150 may be a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect computing device 140 and one or more other devices with each other). For example, the local network may interconnect an on-board computing device in a vehicle with a mobile device of a user in the vehicle. The local network may be configured to send and/or receive data via different protocols, e.g. Bluetooth, Wireless Fidelity ("Wi-Fi"), near field communication ("NFC"), Infrared, cellular, and/or other protocols that enable device to device communication over short distances. In some embodiments, the local network may be connected to public network 150.

In one or more arrangements, enterprise computing infrastructure 120, enterprise data storage platform 130, and computing device 140, and/or the other systems included in computing environment 100 may be any type of computing device capable of communicating with a user interface, receiving input via the user interface, and communicating the received input to one or more other computing devices. For example, enterprise computing infrastructure 120, enterprise data storage platform 130, and computing device 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of time-sensitive task computing platform 110, enterprise computing infrastructure 120, enterprise data storage platform 130, and computing device 140, may, in some instances, be special-purpose computing devices configured to perform specific functions.

Referring to FIG. 1B, time-sensitive task computing platform 110 may include one or more processors 111, memory 112, and communication interface 113. A data bus may interconnect processor 111, memory 112, and communication interface 113. Communication interface 113 may be a network interface configured to support communication between time-sensitive task computing platform 110 and one or more networks (e.g., public network, private network, a local network, or the like). Memory 112 may include one or more program modules having instructions that when executed by processor 111 cause time-sensitive task computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of time-sensitive task computing platform 110 and/or by different computing devices that may form and/or otherwise make up time-sensitive task computing platform 110. For example, memory 112 may have, store, and/or include authentication engine 112a, speech processing engine 112b, task processing engine 112c, and task execution engine 112d. Authentication engine 112a may have instructions that direct and/or cause time-sensitive task computing platform 110 to ensure authenticity of a user and/or device that may interact with enterprise computing infrastructure 120, as discussed in greater detail below. Speech processing engine 112b may have instructions to detect, via the communication interface, voice-based interaction from the authenticated user. In some embodiments, speech processing engine 112b may have instructions to cause the voice-based interaction to be captured as audio data. In some embodiments, speech processing engine 112b may have instructions to transform the audio data to textual data. Task processing engine 112c may have instructions to analyze the textual data to identify a task and/or a query related to an entity. In some embodiments, task processing engine 112c may have instructions to generate, based on the identified task and/or a query, one or more instructions to execute the task or a response to the query. Task execution engine 112d may have instructions to send, to the enterprise server and via the communication channel, the one or more instructions.

Figure 2B:
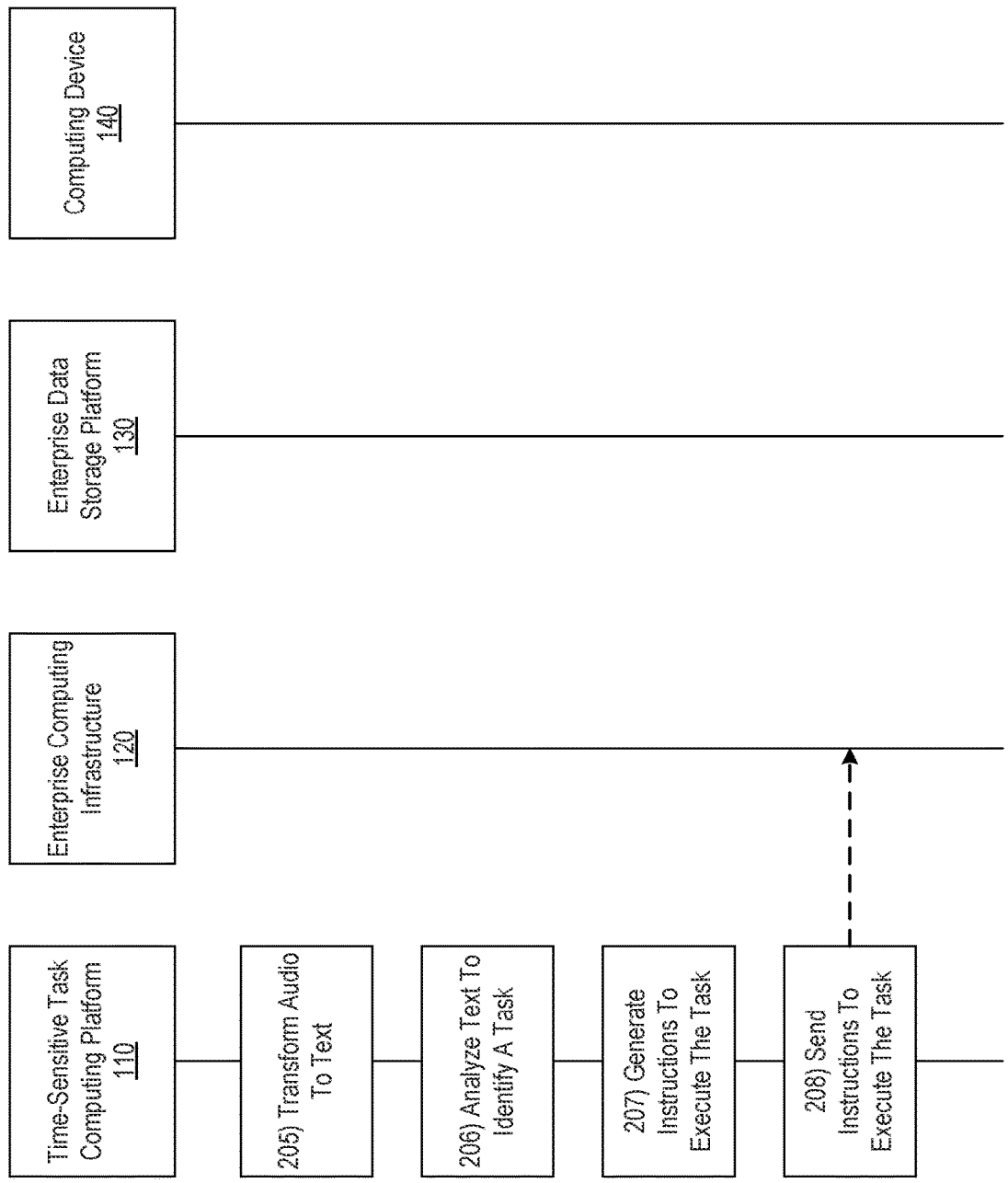

FIGS. 2A-2G depict an illustrative event sequence for voice-based time-sensitive task processing over a high generation cellular network in accordance with one or more example embodiments. Referring to FIG. 2A, at step 201, time-sensitive task computing platform 110 may establish, via the communication interface, a communication channel between a computing device and an enterprise server. For example, at step 201, time-sensitive task computing platform 110 may establish, via the communication interface (e.g., communication interface 113), a communication channel between a computing device (e.g., a computing device 140) and an enterprise server (e.g., enterprise computing infrastructure 120).

In some embodiments, the computing device may be an on-board computing device of a vehicle, and time-sensitive task computing platform 110 may establish, via the communication interface (e.g., communication interface 113), a communication channel between the on-board computing device of the vehicle and the enterprise server (e.g., enterprise computing infrastructure 120). For example, the vehicle may be an automobile, a mobile home, an aircraft, a space vehicle, a watercraft such as a ship, a yacht, a submarine, and so forth. For example, the on-board computing device of the vehicle may be equipped with radio capabilities, a global positioning system ("GPS"), a transceiver equipped to send and receive communication data, and/or a navigation system. Also, for example, the on-board computing device of the vehicle may be equipped with networking capabilities such as for Wireless Fidelity ("Wi-Fi") networks, and/or for local networks configured for device-to-device communications. In some embodiments, the computing device (e.g., computing device 140) may be configured to convert speech-to-text. In some embodiments, the computing device (e.g., computing device 140) may be configured to apply machine learning techniques to recognize voice commands, and/or uniquely identify users by their voice.

In some embodiments, the communication interface may be an on-board graphical user interface associated with the on-board computing device of the vehicle. For example, the on-board graphical user interface may be configured to provide graphical displays such as maps, graphical representations of data (e.g., bar graphs, pie charts, and the like), and display text and figures. In some embodiments, the communication interface may be configured to display multiple interfaces simultaneously, where a first interface displays navigation information (e.g., a map, a route, traffic conditions, and so forth), a second interface displays radio information (e.g., name and frequency of station playing, information about a sound track or news program), a third interface displays information related to financial assets of a corporate entity (e.g., a live broadcast of market information, a real-time stock ticker, various other graphical representations of stock related data, market summary, indices, and the like), a fourth interface displays a dynamically updated textual record of voice-based communications with a user of the vehicle), and so forth.

In some embodiments, the computing device (e.g., computing device 140) may be configured to run an enterprise mobile application hosted by the enterprise server (e.g., enterprise computing infrastructure 120), and the communication interface may be configured to display graphics associated with the enterprise mobile application, and/or interact with the user of the computing device. Such interactions may include, voice interactions, touch interactions, and/or text interactions. Accordingly, the communication interface may be configured with a touch sensitive display that has proximity sensors and/or supports hover detection. Also, for example, the communication interface may be connected to a microphone and speakers, and the communication interface may be configured to automatically detect voice interactions from the user, and/or record voice interactions.

In some embodiments, the communication channel may be established over a fifth-generation cellular network. For example, time-sensitive task computing platform 110 may establish the communication channel over the fifth-generation cellular network. A high generation cellular network, such as a fifth-generation cellular network, is designed for high bandwidth, low latency, high data transmission rates, and/or location accuracies. In some embodiments, multipath propagation capabilities of radio signals, such as multi-input and multi-output ("MIMO") capabilities of higher generation wireless networks enable simultaneous communication channels that reduce delays due to high volume network traffic.

At step 202, time-sensitive task computing platform 110 may authenticate a user of the computing device, where the user is authorized to access the enterprise server. For example, the computing device (e.g., computing device 140) may be configured to run an enterprise mobile application hosted by the enterprise server (e.g., enterprise computing infrastructure 120), and the user may be authorized to access the enterprise server (e.g., enterprise computing infrastructure 120) via the enterprise mobile application. However, as described herein, enterprise computing infrastructure 120 may include various servers and/or databases that store and/or otherwise maintain sensitive information, such as financial account information including account balances, transaction history, account owner information, trade history, market share information, trading portfolio, financial preferences, and/or other confidential and sensitive data. Accordingly, authenticating the user and/or computing device is key to maintaining integrity of such resources.

In some embodiments, authenticating the user may be based on one or more of biometric identifiers associated with the user. For example, time-sensitive task computing platform 110 may authenticate the user based on fingerprint data, facial recognition data, retina scanning data, and/or voice recognition data associated with an authorized user of the computing device (e.g., computing device 140). For example, the computing device (e.g., computing device 140) may be an on-board computing device in a vehicle, and the on-board computing device may be equipped with a user interface that is configured to receive biometric identifiers.

For example, the user interface may include a microphone that detects and captures voice data. The computing device (e.g., computing device 140) may be trained to recognize voice data and associate it uniquely with a user. In some embodiments, the user may be able to train the computing device (e.g., computing device 140) to recognize speech by repeating certain words and/or phrases that may be utilized as labeled data for a training model. In some embodiments, time-sensitive task computing platform 110 may authenticate the user by prompting the user to speak one or more words and/or phrases, or combinations of letters and numerals that have been pre-recorded in an audio file. Time-sensitive task computing platform 110 may detect the voice interaction from the user, compare an audio recording with the pre-recorded audio, and authenticate the user based on a substantial match between the two audio recordings.

In some embodiments, time-sensitive task computing platform 110 may authenticate the user based on a comparison of received biometric identifiers with previously stored biometric identifiers associated with the user. For example, the user interface may include a touch sensitive display that is configured for fingerprint detection. As another example, the user interface may include a camera that is configured to capture facial expressions, and/or configured for retinal scanning. In some embodiments, time-sensitive task computing platform 110 may access the enterprise data storage platform (e.g., enterprise data storage platform 130) to retrieve stored biometric identifiers associated with the user, and compare these with the biometric identifiers received via the computing device (e.g., computing device 140), and use the comparison to authenticate the user of the computing device (e.g., computing device 140).

In some embodiments, authenticating the user may be based on one or more of behavioral identifiers associated with the user. For example, time-sensitive task computing platform 110 may access data from the computing device (e.g., computing device 140) to identify one or more of behavioral identifiers. For example, the computing device (e.g., computing device 140) may be an on-board computing device in a vehicle, and the on-board computing device may access a navigation system to retrieve records of destinations (e.g., home, work, school, close friends, relatives, and so on), and records of preferred routes to destination (e.g., are tollways typically used, does user follow guidance from a records of system or prefers to self-navigate, are there typical stops to a particular grocery store, or to a particular coffee shop, and so forth). Time-sensitive task computing platform 110 may store and/or otherwise maintain such data in enterprise data storage platform 130. Also, for example, the on-board computing device may provide driving data to time-sensitive task computing platform 110, and time-sensitive task computing platform 110 may prompt enterprise computing infrastructure 120 to utilize analytical techniques to detect driving patterns (e.g., accelerating behavior, braking action, speed related preferences, and so forth). In some embodiments, the on-board computing device may provide data from an on-board entertainment system to time-sensitive task computing platform 110, and time-sensitive task computing platform 110 may prompt enterprise computing infrastructure 120 to utilize analytical techniques to detect listening preferences (e.g., favorite radio stations, music genre, preferred artists, and so forth) associated with the user. Also, for example, the on-board computing device may provide from an on-board communications system to time-sensitive task computing platform 110, and time-sensitive task computing platform 110 may prompt enterprise computing infrastructure 120 to utilize analytical techniques to detect one or more contacts that are generally accessed and connected to by an on-board telephone system. Time-sensitive task computing platform 110 may utilize such behavioral identifiers alone or in combination to determine a unique behavior signature for a user, and then utilize this behavior signature to authenticate the computing device (e.g., computing device 140).

In some embodiments, authenticating the user may be based on a location data of the computing device, wherein the location data is based on a high generation cellular network. Cellular networks are generally associated with service areas that are subdivided into cells. Location data for devices are based on the cell within which the device is located. Accordingly, smaller cells provide greater accuracy and reliability of location data. High generation cellular networks, such as a 5G cellular network, may be configured to considerably reduce the cell size, thereby improving accuracy of location data. Accurate location data may be utilized to authenticate the user. For example, time-sensitive task computing platform 110 may utilize location accuracy to determine that the computing device (e.g., computing device 140) is on a Wi-Fi network associated with a user's personal network (e.g., home network, car network, or another shared private network associated with the user). Also, for example, time-sensitive task computing platform 110 may utilize location accuracy to determine that the computing device (e.g., computing device 140) is associated with a vehicle associated with a user, and that such vehicle is at user's home, or in a parking garage associated with the user. Time-sensitive task computing platform 110 may utilize such location data alone or in combination to determine a unique location signature for a user, and then utilize this location signature to authenticate the computing device (e.g., computing device 140).

In some embodiments, authenticating the user may be based on a confidence level associated with the computing device. In some embodiments, time-sensitive task computing platform 110 may determine confidence levels for one or more devices. For example, one or more devices may be configured to run an enterprise mobile application to access resources in the enterprise computing infrastructure (e.g., enterprise computing infrastructure 120), and time-sensitive task computing platform 110 may determine confidence levels, dynamically update such confidence levels, and store data in the enterprise data storage platform (e.g., enterprise data storage platform 130).

A confidence level associated with the computing device is generally indicative of a reliability of the computing device to share confidential and/or sensitive data. For example, a computing device associated with a high confidence level may be more reliable for secure communications than a computing device associated with a low confidence level. The confidence level may be determined based on several factors, including, but not limited to, history of interactions of a device with the enterprise computing infrastructure (e.g., enterprise computing infrastructure 120), past authentications for the device, ownership data for the device, reliability of one or more networks utilized by the device, one or more of a strength of a biometric signature, a behavioral signature, and/or a location signature. In some embodiments, time-sensitive task computing platform 110 may assign weights to these signatures, and/or determine other factors to determine the confidence level. Additional and/or alternate factors may be utilized to determine confidence levels for the one or more devices.

Location data may be retrieved from a variety of sources, such as, for example, from a satellite-based navigation system such as a global positioning system ("GPS"), known locations of cellular towers, and Wireless Fidelity ("Wi-Fi") networks. In some embodiments, time-sensitive task computing platform 110 may utilize a high generation cellular network (e.g., public network 150) to retrieve location data for one or more devices. Time-sensitive task computing platform 110 may analyze the location data to determine distances of the devices from the computing device (e.g., computing device 140), and identify that a particular device is proximate to the computing device (e.g., computing device 140). For example, time-sensitive task computing platform 110 may apply distance measurement techniques to determine distances between devices (e.g., triangulation techniques to locate nodes within a network), and identify that a particular device is proximate to the computing device (e.g., computing device 140).

Also, for example, time-sensitive task computing platform 110 may update, based on location data, movement patterns corresponding to one or more devices proximate to the computing device (e.g., computing device 140). In some embodiments, time-sensitive task computing platform 110 may update a device movement pattern corresponding to one or more devices, and store such a pattern in the enterprise data storage platform (e.g., enterprise data storage platform 130). For instance, time-sensitive task computing platform 110 may update, based on location data, a movement pattern corresponding to the computing device (e.g., computing device 140) to indicate movement of first device (e.g., computing device 140). For example, time-sensitive task computing platform 110 may monitor progress of the computing device (e.g., computing device 140) along a path of daily commute. For example, time-sensitive task computing platform 110 may detect when the computing device (e.g., computing device 140) leaves home, the traffic route taken, any stops, and when the computing device (e.g., computing device 140) arrives at its destination (e.g., office). Additionally, or alternatively, time-sensitive task computing platform 110 may detect arrival and/or departure of proximate devices. As devices move, the movement patterns may, for instance, map where the devices have been and where they are going; in addition, time-sensitive task computing platform 110 may record the device movement patterns, and store the patterns in the enterprise data storage platform (e.g., enterprise data storage platform 130). Thus, time-sensitive task computing platform 110 may map the movement of devices, as well as relative distances between devices as they move. Accordingly, time-sensitive task computing platform 110 may associate a confidence level with the computing device (e.g., computing device 140) based on proximity to trusted devices, as further described herein.

In some embodiments, the confidence level may be based on a knowledge of a second communication channel established between the computing device and a trusted device associated with the user. For example, time-sensitive task computing platform 110 may utilize location data and/or data from a local network to identify one or more devices that are proximate to the computing device (e.g., computing device 140) as devices that are recognizable by enterprise computing infrastructure 120. For example, device information related to one or more devices that are authorized to interact with enterprise computing infrastructure 120 may be stored in the enterprise data storage platform (e.g., enterprise data storage platform 130). For example, device information related to one or more devices that have an authorized enterprise mobile application installed and/or that have been authenticated by a respective user to access user related information in enterprise computing infrastructure 120 may be labeled as trusted devices and enterprise computing infrastructure 120 may associate these devices as trusted devices associated with the user, and store such an association in the enterprise data storage platform (e.g., enterprise data storage platform 130). Subsequently, in authenticating the computing device (e.g., computing device 140), time-sensitive task computing platform 110 may identify a device proximate to the computing device (e.g., computing device 140), and time-sensitive task computing platform 110 may access the enterprise data storage platform (e.g., enterprise data storage platform 130) to confirm that the identified device is in the repository (e.g., enterprise data storage platform 130) of trusted devices. Time-sensitive task computing platform 110 may then authenticate the computing device (e.g., computing device 140) based on the proximity of a trusted device.

In some embodiments, a device may be associated in an enterprise server with the computing device (e.g., computing device 140) that is being authenticated. For example, one or more devices associated with the computing device (e.g., computing device 140) may interact with enterprise computing infrastructure 120 at different times. For example, enterprise computing infrastructure 120 may detect that one or more devices associated with the computing device (e.g., computing device 140) have authorized access to an enterprise mobile application associated with enterprise computing infrastructure 120. For example, enterprise computing infrastructure 120 may detect that a user has authorized a smartphone and a wearable device to access the user's account information via enterprise mobile applications running respectively on these devices. Accordingly, enterprise computing infrastructure 120 may associate these devices as trusted devices associated with the computing device (e.g., computing device 140), and store such an association in the enterprise data storage platform (e.g., enterprise data storage platform 130). Subsequently, in authenticating the computing device (e.g., computing device 140), time-sensitive task computing platform 110 may access the enterprise data storage platform (e.g., enterprise data storage platform 130) to confirm that a proximate device is in the repository (e.g., enterprise data storage platform 130) of trusted devices. As described herein, time-sensitive task computing platform 110 may update, based on location data, movement patterns corresponding to such associated devices, and store the patterns in the enterprise data storage platform (e.g., enterprise data storage platform 130). For example, based on an analysis of location data (e.g., coordinates from global positioning systems), time-sensitive task computing platform 110 may determine that the computing device (e.g., computing device 140) and a wearable device associated with the computing device (e.g., computing device 140) are proximate to each other. For example, an on-board computing device of a vehicle may detect one or more devices that generally access and/or are connected to an on-board network system (e.g., via a Bluetooth connection). Accordingly, time-sensitive task computing platform 110 may label the one or more devices as trusted devices and store such information in the enterprise data storage platform (e.g., enterprise data storage platform 130). Time-sensitive task computing platform 110 may utilize location data associated with such trusted devices, alone or in combination, to determine a confidence level.

In some embodiments, time-sensitive task computing platform 110 may determine the confidence level based on a knowledge of a second communication channel established between the computing device and the trusted device associated with the user. For example, time-sensitive task computing platform 110 may determine that one or more trusted devices share the same cellular network, or the same Bluetooth network, with the computing device (e.g., computing device 140). For example, time-sensitive task computing platform 110 may determine that one or more trusted devices are authenticated to connect to an on-board communication interface via Bluetooth. Based on such information, time-sensitive task computing platform 110 may associate a higher confidence level with the computing device (e.g., computing device 140), and/or the trusted devices.

In some embodiments, time-sensitive task computing platform 110 may determine a threshold value for the confidence level, and authenticate the computing device (e.g., computing device 140) based on the threshold value. For example, time-sensitive task computing platform 110 may automatically authenticate a computing device (e.g., computing device 140) that is associated with a confidence level higher than a first threshold value. As another example, time-sensitive task computing platform 110 may automatically not authenticate a computing device (e.g., computing device 140) that is associated with a confidence level lower than a second threshold value. In some embodiments, time-sensitive task computing platform 110 may identify additional authentication factors for a computing device (e.g., computing device 140) that is associated with a confidence level lower than a specified threshold value.

In some embodiments, time-sensitive task computing platform 110 may periodically and/or dynamically update confidence levels associated with a device. For example, any deviations from known data may cause time-sensitive task computing platform 110 to update the confidence levels. For example, any deviations from data associated with a location signature, biometric signature, behavioral signature, and/or data related to proximity of one or more trusted devices, may trigger time-sensitive task computing platform 110 to update the confidence levels. Also, for example, as voice-based interactions are detected, time-sensitive task computing platform 110 may apply voice recognition techniques to continue to identify authenticity of the voice. Additionally, or alternatively, one or more of the biometric signature, behavioral signature, and/or trusted devices may be used to perform ongoing authentications.

In some embodiments, time-sensitive task computing platform 110 may determine, based on location data, a level of privacy between the user and the computing device. For example, time-sensitive task computing platform 110 may utilize location data and/or data from a local network to determine that the user is alone in a vehicle, or at a personal space (e.g., home, office), and may associate a high level of privacy between the user and the computing device. Also, for example, time-sensitive task computing platform 110 may utilize location data and/or data from a local network to determine that the user is not alone in a vehicle, or at a personal space (e.g., home, office), and may associate a low level of privacy between the user and the computing device. As another example, time-sensitive task computing platform 110 may utilize location data and/or data from a local network to determine that the user is at a public space (e.g., a café, restaurant, shopping center, library, at or near a point of sales location, a public transport vehicle, and so forth), and may associate a low level of privacy between the user and the computing device.

For example, based on analysis of location data, time-sensitive task computing platform 110 may determine that a previously authenticated user has an additional passenger in the car. Accordingly, time-sensitive task computing platform 110 may associate a lower level of privacy between the previously authenticated user and the on-board computing device. In such an instance, time-sensitive task computing platform 110 may suspend all interactions with the previously authenticated user. In some instances, time-sensitive task computing platform 110 may remove any confidential information that may have been displayed on a graphical interface associated with the on-board computing device. Also, for example, based on analysis of additional location data (e.g., location data from a later time, location data after the car makes a stop), time-sensitive task computing platform 110 may determine that the additional passenger in the car has left the car. Accordingly, time-sensitive task computing platform 110 may increase the level of privacy between the previously authenticated user and the on-board computing device. In such an instance, time-sensitive task computing platform 110 may resume all interactions with the previously authenticated user. In some instances, time-sensitive task computing platform 110 may restore any confidential information that may have been displayed on a graphical interface associated with the on-board computing device.

In some embodiments, time-sensitive task computing platform 110 may establish, based on the level of privacy, a second communication channel between the enterprise server and a second computing device associated with the user. For example, upon determining that the user is not alone in a vehicle, time-sensitive task computing platform 110 may determine that communications via the on-board communications interface may not be secure. Accordingly, time-sensitive task computing platform 110 may establish a separate communication channel with another device associated with the user (e.g., a personal mobile device, a personal wearable device, and the like). In some embodiments, time-sensitive task computing platform 110 may utilize location data to determine if one or more trusted devices associated with the user is proximate to the user, and establish the second communication channel with such proximate trusted device.

In some embodiments, time-sensitive task computing platform 110 may select, based on the level of privacy, a different means to communicate via the computing device. For example, upon determining that the user is at a public space, time-sensitive task computing platform 110 may cease communicating with the user via voice and initiate text-based communication.

At step 203, time-sensitive task computing platform 110 may detect, via the communication interface, voice-based interaction from the authenticated user. For example, the computing device (e.g., computing device 140) may be an on-board computing device in a vehicle, and the communication interface associated with the on-board computing device may detect voice-based interaction from the authenticated user within the vehicle. For example, the communication interface associated with the on-board computing device may detect audio from the authenticated user, such as, for example, "buy 100 shares of Entity A at market price," or "buy 100 shares of Entity A at a stop limit of $2135," or "if 50 shares of Entity A get sold at $2500 a share, then immediately invest the entire proceeds into buying shares of Entity B."

At step 204, time-sensitive task computing platform 110 may cause, via the communication interface, the voice-based interaction to be captured as audio data. For example, the computing device (e.g., computing device 140) may be an on-board computing device in a vehicle, and time-sensitive task computing platform 110 may cause a microphone associated with the on-board computing device to capture voice-based interaction from the authenticated user within the vehicle. For example, time-sensitive task computing platform 110 may cause the microphone associated with the on-board computing device to capture audio from the authenticated user, such as, for example, "buy 100 shares of Entity A at market price," or "buy 100 shares of Entity B at a stop limit of 2135.00," or "if 50 shares of Entity A get sold at $2500, then immediately invest the entire proceeds into buying shares of Entity B." Time-sensitive task computing platform 110 may cause captured raw audio to be stored as an audio data file. One or more audio file formats may be utilized, such as, for example, Waveform Audio File Format (WAV), Free Lossless Audio Codec (FLAC), and so forth. In some embodiments, the audio format may be a format that supports compression so as to be readily transmitted over the network. In some embodiments, the file format of the audio data file may be determined based on the configurations and/or processing abilities of the computing device (e.g., computing device 140), and/or enterprise computing infrastructure 120.

Referring to FIG. 2B, at step 205, time-sensitive task computing platform 110 may transform the audio data to textual data. For example, time-sensitive task computing platform 110 may transcribe the audio data to textual data using a speech to text converter tool. The specific tool may be based on one or more factors such as, the language of the captured audio, length of the audio file, type of audio file, amount of background noise, and so forth. In some embodiments, time-sensitive task computing platform 110 may transform the audio data to textual data in real-time. Higher speeds, low latency, and higher bandwidth of high generation cellular networks enable efficient and accurate real-time processing of the audio data.

In some embodiments, time-sensitive task computing platform 110 may transform the audio data to the textual data based on a trained machine learning model personalized for the user of the computing device. For example, pronunciations of one or more keywords may be identified (e.g., pronunciations that differ by geographic region, language, accent) that are specific to the user's speech patterns. Also, for example, one or more words and/or phrases repeated by the user (e.g., "So"), or words and/or phrases that are used more frequently (e.g., "well", "how about", "I would"), or words and/or phrases that are used to fill in gaps in speech (e.g., "ummm", "tsk"), and so forth, may be used to train the model.

In some embodiments, time-sensitive task computing platform 110 may access the enterprise server (e.g., enterprise computing infrastructure 120) to create and store grammars tailored to the task. For example, if the task is related to trading financial assets, then time-sensitive task computing platform 110 may create and store grammars that include words and/or phrases that relate to financial terms. In some embodiments, after a task is identified, time-sensitive task computing platform 110 may restrict the grammar to terms that relate to the task. Also, for example, time-sensitive task computing platform 110 may personalize grammars to the user. For example, the user may be interested in sports, and the grammar may be tailored to the sports genre. As another example, the user may be interested in the technology sector, and the grammar may be tailored to financial terms in the technology sector.

At step 206, time-sensitive task computing platform 110 may analyze the textual data to identify a time-sensitive task related to an entity. For example, at step 206, time-sensitive task computing platform 110 may access the enterprise server (e.g., enterprise computing infrastructure 120) to utilize natural language processing techniques to process and analyze natural language data in the textual data. One or more techniques such as topic and/or word segmentation, part-of-speech tagging, parsing, stemming, relationship extraction, entity relationships, word sense disambiguation, terminology extraction (e.g., based on a specific grammar), and so forth may be utilized to process the textual data. Also, for example, deep learning techniques may be utilized to process the textual data. One or more aspects of step 206 may be performed in coordination with one or more aspects of step 205. For example, step 205 and step 206 may be performed in a dynamically interwoven manner where an output from step 206 reinforces an output from step 205, or vice versa. In some embodiments, time-sensitive task computing platform 110 may process one portion of the speech at step 205 to output a first portion of textual data, and time-sensitive task computing platform 110 may then process, at step 206, the first portion of textual data, while simultaneously processing a second portion of the speech at step 205. Also, for example, the processing of the first portion of textual data at step 206 may inform processing of the second portion of the speech at step 205.

Also, for example, at step 206, time-sensitive task computing platform 110 may access the enterprise server (e.g., enterprise computing infrastructure 120) to identify an entity and a time sensitive task related to an entity. For example, in processing textual data such as, for example, "buy 100 shares of Entity A at market price," time-sensitive task computing platform 110 may identify the entity as "Entity A" and identify the task as "buy 100 shares at market price." In some embodiments, time-sensitive task computing platform 110 may parse the task and break it down into one or more sub-tasks such as, for example, "buy", "100 shares", "at market price". Time-sensitive task computing platform 110 may be configured to recognize "at market price" as being time-sensitive information that may need to be executed immediately. Based on market volatility, it may be critical to execute the trade in real-time within a very short time window from when the user provides the instructions, in order to satisfy the desired "at market price" condition. Failure to do so may cause the user to lose a valuable opportunity.

As another example, at step 206, in processing textual data such as, for example, "buy 100 shares of Entity A at a stop limit of $2135," time-sensitive task computing platform 110 may identify the entity as "Entity A" and identify the task as "buy 100 shares at a stop limit of $2135." In some embodiments, time-sensitive task computing platform 110 may parse the task and break it down into one or more sub-tasks such as, for example, "buy", "100 shares", "at a stop limit of $2135". Time-sensitive task computing platform 110 may be configured to recognize "a stop limit of $2135" as being time-sensitive information that may need to be executed immediately. Based on various market factors, it may be critical to execute the trade in real-time within a very short time window from when the user provides the instructions, in order to satisfy the desired "at a stop limit of $2135" condition. Failure to do so may cause the user to lose a valuable opportunity.

As another example, at step 206, in processing textual data such as, for example, "if 50 shares of Entity A get sold at $2500 a share, then immediately invest the entire proceeds into buying shares of Entity B," time-sensitive task computing platform 110 may identify entities as "Entity A" and "Entity B", and identify a first task as "sell 50 shares of Entity A at 2500 per share." Time-sensitive task computing platform 110 may then determine that if 50 shares are sold at 2500 per share, then the proceeds would total $125,000, and may accordingly identify a second task conditional on the first task, where the second task is identified as "buy shares of Entity B for $125,000." Time-sensitive task computing platform 110 may configure an alert to be triggered upon completion or non-completion of the first task.

Accordingly, the techniques described herein leverage properties of a high generation cellular network to enable real-time transactions to be performed effectively. Based on market volatility and other factors, time may be of the essence, and it may be critical to execute the trade in real-time within a very short time window from when the user provides the instructions.

At step 207, time-sensitive task computing platform 110 may generate, based on the identified task, one or more instructions to execute the task. For example, time-sensitive task computing platform 110 may access the enterprise server (e.g., enterprise computing infrastructure 120) to identify an entity, "Entity A" and identify a task, "buy 100 shares at market price." In some embodiments, time-sensitive task computing platform 110 may parse the task and break it down into one or more sub-tasks such as, for example, "buy", "100 shares", "at market price". Accordingly, time-sensitive task computing platform 110 may generate one or more instructions such as, for example, a first instruction to "buy". Time-sensitive task computing platform 110 may generate a second instruction to "determine current market price for Entity A", and a third instruction to "monitor market price for Entity A." Based on the determined market price, time-sensitive task computing platform 110 may generate a fourth instruction to "transfer '(# of shares×Market Price)+Cash Buffer' from Account I to Account II." In some embodiments, the cash buffer may be determined based on one or more factors such as market volatility, the entity, market price, price fluctuation, and so forth. For example, if market price for Entity A has ranged from $2.50 to $2.75 with a spread of $0.75, then time-sensitive task computing platform 110 may determine that for 100 shares, a cash buffer of $100 may be sufficient to cover any potential fluctuations in market price from the time of transfer of funds to the time of execution of the trade. As another example, if market price for Entity A has ranged from $250 to $275 with a spread of $75, then time-sensitive task computing platform 110 may determine that for 100 shares, a cash buffer of $7500 may be sufficient to cover any potential fluctuations in market price from the time of transfer of funds to the time of execution of the trade. Also, for example, the cash buffer may be dynamically updated based on the type of trade.

As another example, at step 207, time-sensitive task computing platform 110 may access the enterprise server (e.g., enterprise computing infrastructure 120) to identify an entity as "Entity A" and identify a task as "buy 100 shares at a stop limit of $2135." In some embodiments, time-sensitive task computing platform 110 may parse the task and break it down into one or more sub-tasks such as, for example, "buy", "100 shares", "at a stop limit of $2135". Accordingly, time-sensitive task computing platform 110 may generate one or more instructions such as, for example, a first instruction to "buy". Time-sensitive task computing platform 110 may generate a second instruction to "monitor market price for Entity A." Based on the stop limit of $2135, time-sensitive task computing platform 110 may generate a third instruction to "transfer '(# of shares×stop limit)' from Account I to Account II," thereby generating an instruction to transfer $213500 from Account I to Account II. Time-sensitive task computing platform 110 may determine that a cash buffer may not be needed for a type of trade which is a "stop limit" as the upper limit for selling price is determined to be $2135.

As another example, at step 207, time-sensitive task computing platform 110 may access the enterprise server (e.g., enterprise computing infrastructure 120) to identify entities as "Entity A" and "Entity B", and identify a first task as "sell 50 shares of Entity A at 2500 per share," and identify a second task conditional on the first task, where the second task is identified as "buy shares of Entity B for $125,000." Accordingly, time-sensitive task computing platform 110 may generate one or more instructions such as, for example, a first instruction to "sell 50 shares of Entity A at 2500 per share," and a second instruction, for example, "generate notification when the first task is completed," and a third instruction, for example, "IF '{notification=False}' and'{{Current Time>End of Time for Trading Day}=TRUE} THEN cancel second task". Time-sensitive task computing platform 110 may generate a fourth instruction such as, for example, "IF '{notification=TRUE}' and '{{Current Time<End of Time for Trading Day}=TRUE} THEN {execute second task}." Accordingly, the instructions for "{execute second task}" may be determined to be "buy X shares of Entity B, where X=greatest integer function [125000/(market price for Entity B)]".

As another example, textual data transcript of a voice-based interaction may include "Shares of Entity A are expected to fall sharply after the trade deal is signed between Country A and Country B, and then expected to recover the next day". Based on the textual data, time-sensitive task computing platform 110 may identify keywords such as "fall sharply", "after", "trade deal is signed", "recover", "next day", and so forth. Based on the textual data, time-sensitive task computing platform 110 may determine that user may wish to purchase shares when the prices fall sharply, and then sell the shares the next day when the prices recover and/or rise the next day.

Accordingly, time-sensitive task computing platform 110 may generate an instruction "determine {date} and {time} for trade deal between Country A and Country B." Then, time-sensitive task computing platform 110 may generate another instruction "determine {share price} for {entity} on {date} and at {time}", and another instruction, "determine {share price} for {entity} on {date} and after {time} and at {close of market}", and another instruction "if difference of [{share price} for {entity} on {date} and at {time}] and [{share price} for {entity} on {date} and after {time} and at {2 minutes before close of market}] exceeds 10% of [{share price} for {entity} on {date} and at {time}], then prompt user to buy 1000 shares of {entity} on {date} and after {time} and at {close of market}". Then, time-sensitive task computing platform 110 may generate another instruction "determine {expected opening share price} for {entity} on {date+1 day} and before {opening of market}" and may generate an instruction "if difference between [{expected opening share price} for {entity} on {date+1 day}] and [purchase price of shares of {entity} on {date} and after {time} and at {close of market}] exceeds 15% of [purchase price of shares of {entity} on {date} and after {time} and at {close of market}], then prompt user to sell 1000 shares of {entity} on {date+1 day} and at {opening of market}."

At step 208, time-sensitive task computing platform 110 may send, to the enterprise server and via the communication channel, the one or more instructions to execute the time-sensitive task. For example, time-sensitive task computing platform 110 may send, to the enterprise server (e.g., enterprise computing infrastructure 120) and via the communication channel, the one or more instructions to execute the time-sensitive task. In some embodiments, the enterprise server (e.g., enterprise computing infrastructure 120) may be further directed to communicate with one or more external systems to complete execution of the task. For example, the instruction to "transfer '(# of shares×stop limit)' from Account I to Account II," may be sent by the enterprise server (e.g., enterprise computing infrastructure 120) to an external financial server (e.g., another bank). Also, for example, the instruction to "buy X shares of Entity B, where X=greatest integer function[125000/(market price for Entity B)]" may be sent by the enterprise server (e.g., enterprise computing infrastructure 120) to an external trading platform, or to the floor of a relevant stock exchange.

Figure 2C:
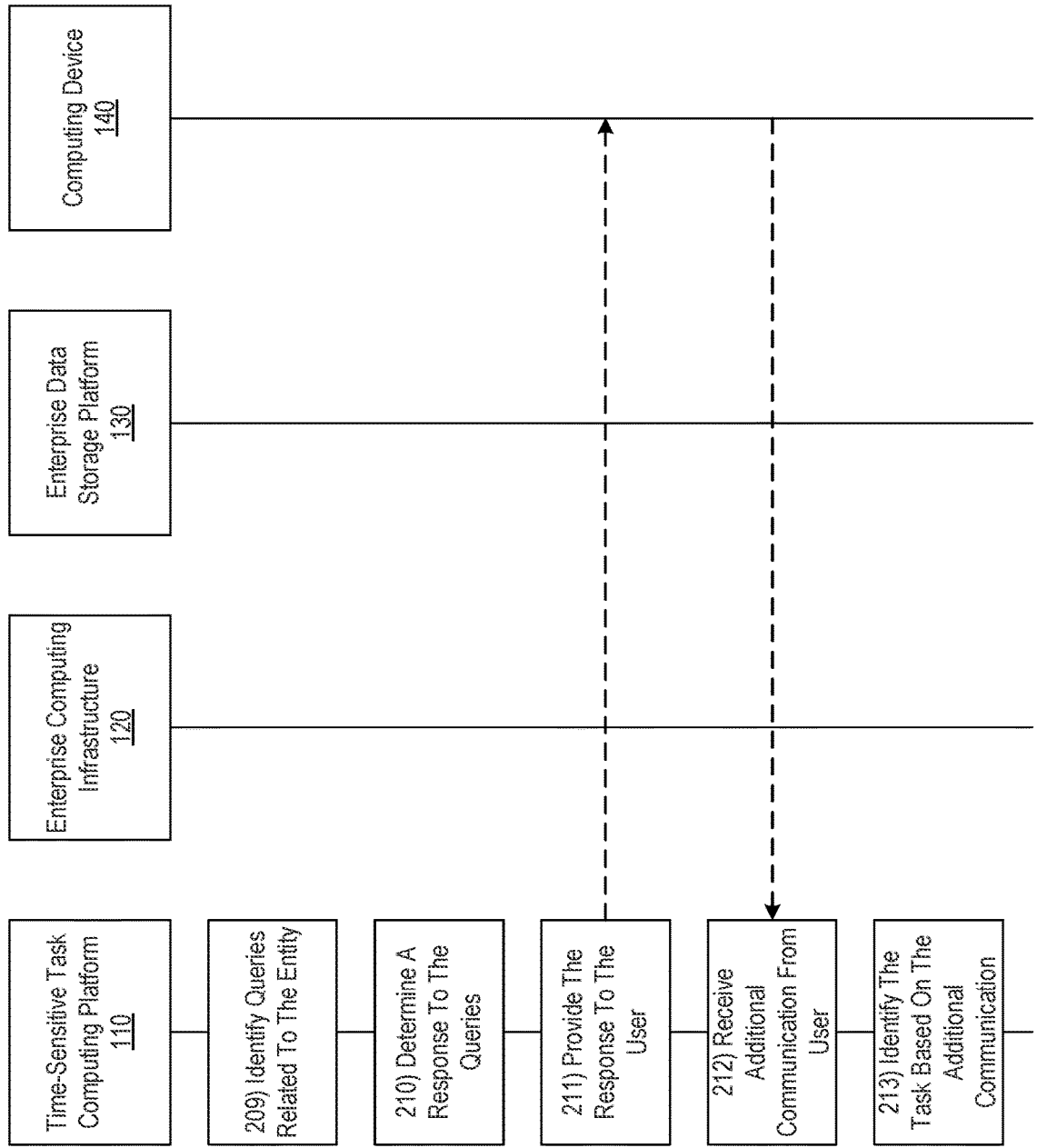

Referring to FIG. 2C, at step 209, time-sensitive task computing platform 110 may identify, in the textual data, one or more queries related to the entity. For example, time-sensitive task computing platform 110 may identify queries such as "What is the current stock price for Entity A?" or "What is the six-month high?" or "What is the six-month low?" or "What is the industry sector for Entity A" or "Who are some of the competitors for Entity A?" and so forth. Also, for example, time-sensitive task computing platform 110 may identify a query such as "Is my relationship manager available" or "connect me to my dedicated trading professional."

At step 210, time-sensitive task computing platform 110 may determine a response to the one or more queries related to the entity. For example, for the one or more queries, time-sensitive task computing platform 110 may access the enterprise server (e.g., enterprise computing infrastructure 120) to determine a response to the one or more queries related to the entity. In some embodiments, task computing platform 110 may access one or more publicly available external servers to determine the response. As another example, in response to the query "Is my relationship manager available," time-sensitive task computing platform 110 may determine, for example by accessing enterprise data storage platform 130, the identity of the relationship manager, and determine, via enterprise computing infrastructure 120 if the identified relationship manager is available. Speed and accuracy are crucial factors in such determinations, as time is of the essence; accordingly, and a high generation cellular network may be leveraged to achieve both speed and accuracy.

At step 211, time-sensitive task computing platform 110 may cause the computing device to provide, via the communication interface, the response to the user. For example, for the query "What is the current stock price for Entity A?", time-sensitive task computing platform 110 may determine and provide a response such as, for example, "$255.60." As another example, for the query "What is the industry sector for Entity A?", time-sensitive task computing platform 110 may determine and provide a response such as, for example, "Information Technology." Also, for example, after determining that the identified relationship manager is available, time-sensitive task computing platform 110 may cause the computing device to display a telephone number for the identified relationship manager, and prompt the user if she wishes to connect with the relationship manage via a videoconference call.

At step 212, time-sensitive task computing platform 110 may receive, based on the response and via the communication interface, an additional communication from the user. For example, time-sensitive task computing platform 110 may detect additional voice-based interaction from the user in response to the responses provided to the user. For example, time-sensitive task computing platform 110 may identify, from a transcript of the audio of the additional voice-based interaction from the user, that user queried "Who are the top 5 highest volume gainers in the IT sector?" or "I want to spend a 100 grand on the top 5 performers. What do you recommend?". As another example, the additional communication from the user may be an indication to connect the user with the relationship manager.

At step 213, time-sensitive task computing platform 110 may identify the task based on the additional communication. Generally, aspects of step 213 may be performed in a manner similar to those of step 207 of FIG. 2B. In some embodiments, time-sensitive task computing platform 110 may dynamically update and analyze the textual data in real-time as voice-based interactions are detected, and responses are provided, by time-sensitive task computing platform 110. Based on updated textual data, time-sensitive task computing platform 110 may dynamically identify entities and tasks based on ongoing interactions with the user. Also, for example, time-sensitive task computing platform 110 may identify the task as "connect user with the relationship manager," and may execute the task by establishing a videoconference between the user and the relationship manager.

Referring to FIG. 2D, at step 214, time-sensitive task computing platform 110 may receive, from the user via the communication interface, one or more queries related to a second entity. For example, in response to a query "Who is the main competitor for Entity A," time-sensitive task computing platform 110 may provide a response, for example, "Entity B". Based on the response, time-sensitive task computing platform 110 may exchange one or more voice-based interactions with the user. For example, time-sensitive task computing platform 110 may detect, by analyzing updated textual data, that the user has additional queries related to Entity B, such as, for example, "How low was Entity B yesterday?" or "What is the expected opening price for Entity B?" or "Is there any correlation between the share price for Entity A and that of Entity B?" and so forth.

At step 215, time-sensitive task computing platform 110 may determine, based on the one or more queries, one or more attributes of the second entity. For example, time-sensitive task computing platform 110 may communicate with enterprise server (e.g., enterprise computing infrastructure 120) and/or one or more external systems to determine the one or more attributes of the second entity. For example, time-sensitive task computing platform 110 may determine attributes such as current market price, historical data for prices, changes in price, volume of trading, corporate structure for the second entity, market analysis relevant to the second entity, trends associated with the second entity, price correlations between the entity and the second entity, and so forth.

At step 216, time-sensitive task computing platform 110 may identify the task related to the entity based on the one or more attributes of the second entity. For example, time-sensitive task computing platform 110 may access the enterprise server (e.g., enterprise computing infrastructure 120) to determine that the share price for the second entity may be positively correlated with the share price for the entity. Accordingly, time-sensitive task computing platform 110 may detect additional instructions from the user to purchase certain quantities of shares of the entity when the price for the second entity is above a certain threshold. Also, for example, time-sensitive task computing platform 110 may detect additional instructions from the user to sell certain quantities of shares of the entity when the price for the second entity is below a certain threshold.

Referring to FIG. 2E, at step 217, time-sensitive task computing platform 110 may retrieve, from a repository of user data, a template associated with the task. For example, time-sensitive task computing platform 110 may retrieve, from a repository of user data (e.g., enterprise data storage platform 130), a template associated with the task. In some embodiments, the template associated with the task may be a trading strategy associated with the task. For example, time-sensitive task computing platform 110 may generate trading strategies associated with particular tasks and store them in the enterprise data storage platform (e.g., enterprise data storage platform 130). When a particular task is identified, time-sensitive task computing platform 110 may search the enterprise data storage platform (e.g., enterprise data storage platform 130) for existing trading strategies associated with the particular task.

In some embodiments, the template associated with the task may be based on the type of task. For example, different templates may be associated with different types of trades, such as for example, option trading, penny-stock trading, day trading, and so forth. Also, for example, different templates may be associated with different types of trading transaction, such as buy, sell, put, call, stop limit, market, and so forth. As another example, different templates may be associated with different types of financial instruments, such as, for example, stocks, bonds, exchange-traded funds ("ETFs"), and so forth.

At step 218, time-sensitive task computing platform 110 may generate the one or more instructions based on the identified template. For example, the identified template associated with an entity may be a template based on a moving average. For example, time-sensitive task computing platform 110 may access the enterprise server (e.g., enterprise computing infrastructure 120) to generate one or more instructions to determine an average of a security associated with the entity over a predetermined short time period ("short term moving average"), and an average of the security over a predetermined long time period ("long term moving average"). Time-sensitive task computing platform 110 may then generate one or more instructions to determine when the short-term moving average crosses above or below the long-term moving average. Based on such information, time-sensitive task computing platform 110 may generate one or more instructions to trade the security.

Referring to FIG. 2F, at step 219, time-sensitive task computing platform 110 may associate a time sequence with the captured audio data. In some instances, due to unavailability of a network (e.g., public network 150), time-sensitive task computing platform 110 may not be able to establish and/or maintain a communication channel with the enterprise server (e.g., enterprise computing infrastructure 120). For example, a user may be in a remote area with little or no access to a network (e.g., public network 150). However, via one or more other means (e.g., conversation with another person, a newspaper, news over the radio, and the like), the user is able to determine that the shares of a corporation, such as Entity A, may rise significantly. Accordingly, the user would like to purchase some shares, but may not be able to access the network. However, as price fluctuations are time-sensitive, the user may want the benefit of the time at which the instruction to purchase was provided, rather than a later time at which a network may become available, and the instruction is processed (e.g., and the price may have already risen, the purchase thereby incurring a potential loss). Accordingly, in some embodiments, an enterprise mobile application running on the computing device (e.g., computing device 140) may be configured to detect and capture user's voice-based interaction, and associate a timestamp with the captured audio. In some embodiments, the computing device (e.g., computing device 140) may be configured to transform the audio to textual data. In some embodiments, time-sensitive task computing platform 110 may transform the audio to textual data after a communication channel is established.

For example, time-sensitive task computing platform 110 may access the enterprise server (e.g., enterprise computing infrastructure 120) to associate a timestamp with the audio data. In some embodiments, time-sensitive task computing platform 110 may associate a timestamp with each word at the time of transforming audio data to textual data, thereby generating a chronological transcript of the voice-based interaction. For example, in processing textual data such as, for example, "buy 100 shares of Entity A at market price," time-sensitive task computing platform 110 may identify the entity as "Entity A" and identify the task as "buy 100 shares at market price." Time-sensitive task computing platform 110 may associate the words in the identified task with a time stamp, such as, for example, in the phrase "buy 100 shares at market price," the word "buy" may be associated with a timestamp of "08:05:34.02", and the word "price" may be associated with a timestamp of "08:05:36.08".

At step 220, time-sensitive task computing platform 110 may associate, based on the time sequence, the identified task with a first time. For example, time-sensitive task computing platform 110 may access the enterprise server (e.g., enterprise computing infrastructure 120) to identify a task and based on the time sequence, the words associated with the identified task may be associated with a time sequence. In some embodiments, time-sensitive task computing platform 110 may identify a first time from this time sequence and associate the first time with the identified task. For example, for the identified task "buy 100 shares at market price," the word "buy" may be associated with a timestamp of "08:05:34.02", and the word "price" may be associated with a timestamp of "08:05:36.08." Accordingly, time-sensitive task computing platform 110 may identify the first time as "08:05:36" and associate the first time with the identified task "buy 100 shares at market price." In some embodiments, time-sensitive task computing platform 110 may store the association of the time with the task in the enterprise data storage platform (e.g., enterprise data storage platform 130) after a communication channel is established. In some embodiments, time-sensitive task computing platform 110 may store the association of the time with the task locally at the computing device (e.g., computing device 140).

At step 221, time-sensitive task computing platform 110 may generate the one or more instructions to execute the task based on a task attribute at the first time. For example, time-sensitive task computing platform 110 may access the enterprise server (e.g., enterprise computing infrastructure 120) to associate the first time "08:05:36" with the identified task "buy 100 shares at market price," and generate the one or more instructions to execute the task based on a task attribute at the first time. For example, time-sensitive task computing platform 110 may generate a first instruction to determine "Market Price=market price of the shares of Entity A at '08:05:36'," and may generate a second instruction to "buy 100 shares at the Market Price." In some embodiments, time-sensitive task computing platform 110 may generate the one or more instructions after a communication channel is established. In some embodiments, time-sensitive task computing platform 110 may generate the one or more instructions locally at the computing device (e.g., computing device 140).

At step 222, time-sensitive task computing platform 110 may establish the communication channel with the computing device after the first time. For example, upon availability of a network (e.g., public network 150), time-sensitive task computing platform 110 may establish a communication channel between the computing device (e.g., computing device 140) and the enterprise server (e.g., enterprise computing infrastructure 120). In some embodiments, step 222 may be performed prior to performing step 220. For example, time-sensitive task computing platform 110 may store the association of the first time with the identified task in the enterprise data storage platform (e.g., enterprise data storage platform 130), and time-sensitive task computing platform 110 may generate the one or more instructions based on the first time, after the communication channel is established. In some embodiments, step 222 may be performed after performing step 220, but prior to performing step 221. For example, time-sensitive task computing platform 110 may store the association of the time with the task locally at the computing device (e.g., computing device 140) before the communication channel is established, and time-sensitive task computing platform 110 may generate the one or more instructions based on the first time, after the communication channel is established.

At step 223, time-sensitive task computing platform 110 may send, upon establishing the communication channel with the computing device after the first time, the one or more instructions to execute the task. For example, time-sensitive task computing platform 110 may send, to the enterprise server (e.g., enterprise computing infrastructure 120) and via the communication channel, the one or more instructions to execute the time-sensitive task. For example, the communication channel may be established at a time "08:15:26", which is after the first time "08:05:36." However, time-sensitive task computing platform 110 may send the one or more instructions to execute the task based on the first time, "08:05:36."

Referring to FIG. 2G, at step 224, time-sensitive task computing platform 110 may retrieve, from a repository of user data, historical data related to the user. For example, time-sensitive task computing platform 110 may access the enterprise data storage platform (e.g., enterprise data storage platform 130) to retrieve historical data related to the user. For example, time-sensitive task computing platform 110 may cause data on user preferences to be stored in the enterprise data storage platform (e.g., enterprise data storage platform 130) such as, for example, if the user prefers to trade in specific sectors (e.g., energy, financials, consumer staples, technology, real estate, energy, and so forth), or specific regions (e.g., New York Stock Exchange, London Metals Exchange, Japanese stocks), or a type of security (e.g., stocks, bonds, ETFs), and so forth. In some embodiments, time-sensitive task computing platform 110 may determine that the user is generally interested in penny stocks, or shares that are trading with heavy volume, or shares with a highest volatility, or the top 5 performers in a certain sector, and time-sensitive task computing platform 110 may cause data such data to be stored in the enterprise data storage platform (e.g., enterprise data storage platform 130).

As another example, based on historical transactions, time-sensitive task computing platform 110 may determine that the user's trade preferences are responsive to the news headlines. For example, the computing device (e.g., computing device 140) may be an on-board computing device in a vehicle, and time-sensitive task computing platform 110 may determine that voice-based interactions are generally detected during the time the user listens to news and analysis on the business channel via the on-board radio, at or around the time the market opens in Hong Kong ("HK"). In some embodiments, time-sensitive task computing platform 110 may capture audio from the radio as well as from the voice-based user interactions. In some embodiments, time-sensitive task computing platform 110 may transform the audio into textual data and identify multiple, separate voices (e.g., commentators on the radio program) and the user. In some embodiments, time-sensitive task computing platform 110 may associate time stamps with the textual data. Also, for example, based on past identified tasks, time-sensitive task computing platform 110 may determine that an identified task is generally related to one or more entities that are in the news, and/or that are discussed during the analysis that is broadcast on the business channel via the on-board radio. The timestamped textual data may be utilized to draw inferences as to user preferences. For example, time-sensitive task computing platform 110 may use one or more machine learning models to correlate tasks identified in the audio captured via the on-board computing device, entities discussed in the radio program, and time associated with such events.

At step 225, time-sensitive task computing platform 110 may create, based on machine learning techniques applied to the historical data, one or more task templates associated with the user. For example, time-sensitive task computing platform 110 may access the enterprise server (e.g., enterprise computing infrastructure 120) to determine that the user prefers to trade shares in the financial sector. Accordingly, the enterprise server (e.g., enterprise computing infrastructure 120) may monitor the market information for financials. Based on such data, time-sensitive task computing platform 110 may create one or more task templates. For example, time-sensitive task computing platform 110 may create a template, for example, "provide user with the top 5 performers in the financial sector at noon each trading day, along with the market price for each corporation." Also, for example, time-sensitive task computing platform 110 may monitor news related to the financial sector, and may create another template, for example, "if there is a {data breach} related to {entity}, ask user if market information is to be provided," and create a conditional template, "if user response is "Yes" then determine market price for shares of "entity}." In some instances, the template may be, for example, "if there is a {major store closing} related to {entity}, and user owns shares of {entity}, then ask user if he would like to sell the shares," and create a conditional template, "if user response is "Yes" then determine number of shares owned} and market price for shares of {entity}."

As another example, as described herein, time-sensitive task computing platform 110 may access the enterprise server (e.g., enterprise computing infrastructure 120) to use one or more machine learning models to correlate tasks identified in an audio captured via the on-board computing device, entities discussed in the radio program, and time associated with such events. Based on such data, time-sensitive task computing platform 110 may create one or more task templates. For example, time-sensitive task computing platform 110 may create a template, such as "if {entity} is discussed in {program} at {opening time of Hong Kong exchange}, and if {keyword} is detected, then suggest {keyword-based suggestion}." For example, based on historical data, time-sensitive task computing platform 110 may have determined that keywords such as "rise", "bullish", "high opening price", and so forth may be associated with a keyword-based suggestion such as "buy shares of {entity}". Also, for example, based on historical data, time-sensitive task computing platform 110 may have determined that keywords such as "sharp decline", "bearish", "fall", "crash" and so forth may be associated with a keyword-based suggestion such as "sell shares of {entity}".

Also, for example, time-sensitive task computing platform 110 may access the enterprise server (e.g., enterprise computing infrastructure 120) to create a template for one or more financial instruments that are in a user's trading portfolio. For example, time-sensitive task computing platform 110 may determine a threshold share price, a threshold for a percentage loos or gain, a threshold based on a volume of trading, a threshold based on one or more parameters associated with shares in the same sector as a particular entity. Time-sensitive task computing platform 110 may create templates for transactions of the financial assets based on such thresholds. For example, time-sensitive task computing platform 110 may create templates for when additional shares of an entity may be purchased or when existing shares of the entity may be sold, or when no action is required.

As another example, time-sensitive task computing platform 110 may access data from a mapping software to determine that the user typically stops for donuts on Fridays at the bakery at the corner of $12^{th}$ and Madison in City A. Accordingly, time-sensitive task computing platform 110 may create a template, "On Fridays, prompt user 5 minutes before the intersection of $12^{th}$ and Madison to stop for donuts." In some embodiments, time-sensitive task computing platform 110 may access data from one or more other applications on computing device 140 to identify other popular donut stores on user's route. Accordingly, time-sensitive task computing platform 110 may create a template, "On next Friday, prompt user 10 minutes before the intersection of $12^{th}$ and Madison to try donuts from Donut Store B." As another example, if user takes a detour, time-sensitive task computing platform 110 may access data from one or more other applications on computing device 140 to identify other popular donut stores on user's new route. Accordingly, time-sensitive task computing platform 110 may create a template, "Prompt user to try donuts from Donut Store C."

Task templates may be created for one or more additional tasks. For example, time-sensitive task computing platform 110 may access calendar data from one or more applications on computing device 140 to determine if there is an upcoming birthday or special event, and create templates for recommendations for these events. Also, for example, time-sensitive task computing platform 110 may access one or more applications on computing device 140 to determine if there is an upcoming payment on a bill (e.g., credit card, utility, or the like), and create templates for recommendations and/or reminders for such tasks. As another example, time-sensitive task computing platform 110 may create templates related to discounted products, sales, and other consumer related information. In some instances, information based on such templates may be provided in real time as a vehicle proceeds to a destination. For example, time-sensitive task computing platform 110 may determine, based on user's search history, that user may be looking for a formal evening gown. Time-sensitive task computing platform 110 may create a template, such as "Map location data to identify {store} with {sale/discount} for {clothing wear}". In some embodiments, the template may be used to generate the task "We are {location-based distance} away from {name of store} with {type of discount} for {customer preferred clothing wear}. Would you like to stop?"

As another example, task templates may be created based on user preferences. For example, time-sensitive task computing platform 110 may detect user interaction, and identify a query such as "Let me know when shares of Entity A hits $17," and time-sensitive task computing platform 110 may access the enterprise server (e.g., enterprise computing infrastructure 120) to create a task template such as "provide share price when share price of Entity A hits $17". Also, for example, time-sensitive task computing platform 110 may detect user interaction, and identify a query such as "Let me know when Entity A is within 20% of its currently traded value of $17," and time-sensitive task computing platform 110 may create a task template such as "provide share price when share price of Entity A is within 20% of $17".

In some embodiments, time-sensitive task computing platform 110 may access the enterprise server (e.g., enterprise computing infrastructure 120) to utilize one or more machine learning models to determine a "next best" action, and create a task template based on such determination. For example, an artificial intelligence ("AI") based model may be utilized to generate "next best" recommendations based on one or more factors (e.g., analysis of historical data, market trends, analysis of political and/or business news, analysis of merger and acquisition activity, pending trade negotiations between nations, weather related disaster data, and so forth). Based on output of such AI models, although user queries may relate to shares of Entity A, time-sensitive task computing platform 110 may create a task template to recommend trades in financial assets of entities related to Entity A.

At step 226, time-sensitive task computing platform 110 may provide, based on the one or more task templates and via the communication interface, one or more task recommendations to the user. In some embodiments, the task recommendations may be provided via voice-based communications over the communication interface. For example, time-sensitive task computing platform 110 may have created a template, for example, "provide user with the top 5 performers in the financial sector at noon each trading day, along with the market price for each corporation." Based on this template, and based on the machine learning models, time-sensitive task computing platform 110 may provide a voice-based recommendation to the user at noon, such as, "The top 5 performers in the financial sector today are Entity B, Entity C, Entity D, Entity E, and Entity F. It is reported that Entity C is in merger talks with Entity D. We recommend that you purchase 1000 shares for Entity C and 2000 shares of Entity D." Additional user interactions may be processed, for example, in accordance with step 201 to step 208.

As another example, time-sensitive task computing platform 110 may have created a template, for example, "if there is a {major store closing} related to {entity}, and user owns shares of {entity}, then ask user if he would like to sell the shares," and may have created a conditional template, "if user response is "Yes" then determine number of shares owned} and market price for shares of {entity}." Based on these templates, and based on the machine learning models, time-sensitive task computing platform 110 may provide a voice-based recommendation to the user, such as "Entity B is shutting down all stores in the U.S. You own 15000 shares of Entity B, and these are trading at $155 each, and prices are expected to decline later today. Would you like to sell the shares now?" Additional user interactions may be processed, for example, in accordance with step 201 to step 208.

As another example, time-sensitive task computing platform 110 may have created a template, such as "if {entity} is discussed in {program} at {opening time of Hong Kong exchange}, and if {keyword} is detected, then suggest {keyword-based suggestion}." Based on a real-time analysis of textual data from the car radio, time-sensitive task computing platform 110 may identify a commentator discussing an initial public offering ("IPO"), and state "all eyes are on Entity D and its IPO at the HK stock exchange." For example, based on historical data, time-sensitive task computing platform 110 may have determined that the keyword "IPO" may be associated with a keyword-based suggestion such as "buy shares of {entity}". Accordingly, based on the template, and based on the machine learning models, time-sensitive task computing platform 110 may provide a voice-based recommendation to the user, such as "Entity D has an IPO at the HK stock exchange with an initial price of $165. Entity D is in the technology sector which is trending upward globally. We recommend that you purchase 25000 shares of Entity D when it starts trading."

As described herein, in some embodiments, providing the one or more task recommendations to the user may occur prior to detecting a voice-based interaction from the user. For example, in response to a task template such as "provide share price when share price of Entity A hits $17," time-sensitive task computing platform 110 may initiate a voice-based communication with the user, and provide a recommendation to the user, such as "Jonas, you wanted a reminder when share price of Entity A hits $17. Its trading at $17.50 and trending upward. We recommend you hold and sell a 100 when the price hits $18." Also, for example, in response to a task template such as "provide share price when share price of Entity A is within 20% of $17," time-sensitive task computing platform 110 may initiate a voice-based communication with the user, and provide a recommendation to the user, such as "Jonas, you wanted a reminder when share price of Entity A is within 20% of $17. Its trading at $16.85 and trending up. We recommend you sell 10000 shares when the price is at $16.95. You will have 30000 shares remaining."

As another example, time-sensitive task computing platform 110 may have created a template, such as "We are {location-based distance} away from {name of store} with {type of discount} for {customer preferred clothing wear}. Would you like to stop?" Based on location data from a mapping software, time-sensitive task computing platform 110 may provide an alert, such as, for example, "We are a block away from Mall X where Store Y has an ongoing 50% sale for evening gowns. Would you like to stop?"

In some embodiments, providing the one or more task recommendations may be based on a level of privacy between a user and computing device 140. For example, if analysis of location data indicates that computing device 140 is located at a public location, then time-sensitive task computing platform 110 may determine that the level of privacy is low, and may, accordingly, not initiate a voice-based communication with the user, and instead use alternate means to communicate with the user, for example, initiate a phone call or provide a text message. In some embodiments, time-sensitive task computing platform 110 may determine that a trusted device associated with the user (e.g., a mobile phone, a wearable device) is proximate to the user, and may provide the one or more task recommendations via the trusted device of the user.

Additional user interactions may be detected in response to providing the one or more task recommendations to the user, and such additional user interactions may be processed, for example, in accordance with the descriptions in step 201 through step 208.

The techniques described herein are based on near-real time authentication of events and exchange of data and communications between devices over multiple communication channels. Such activities are enabled by at least the high bandwidth, low latency, high data transmission rates, and/or location accuracies associated with evolving high generation cellular networks (e.g., public network 150), that may optionally be configured for seamless communications with local networks, and/or private networks (e.g., private network 160).

Figure 3:
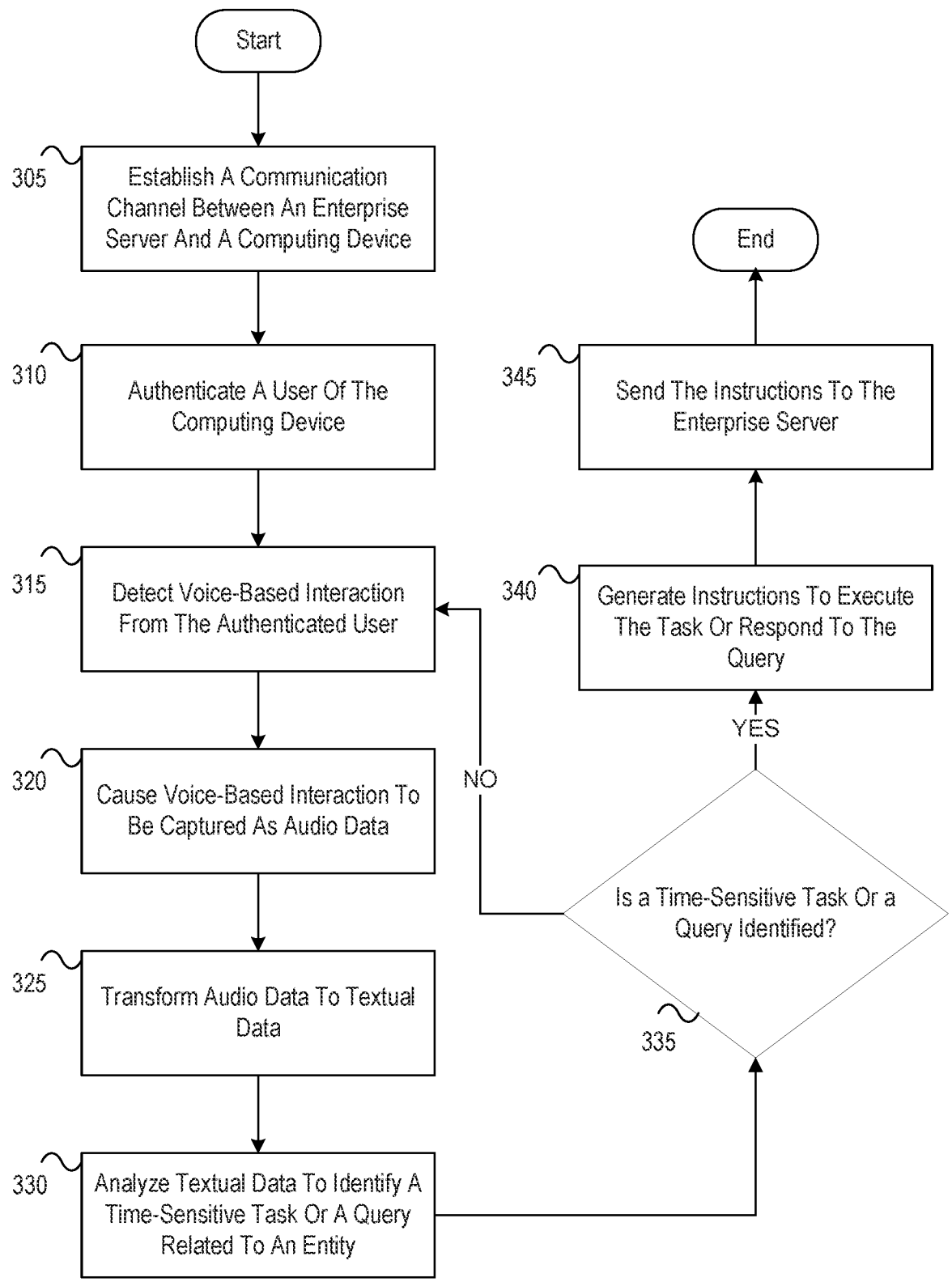
FIG. 3 depicts an illustrative method for voice-based time-sensitive task processing over a high generation cellular network in accordance with one or more example embodiments.

FIG. 3 depicts an illustrative method for voice-based time-sensitive task processing over a high generation cellular network in accordance with one or more example embodiments. Referring to FIG. 3, at step 305, a computing platform having at least one processor, a communication interface, and memory may establish, via the communication interface, a communication channel between a computing device and an enterprise server. At step 310, the computing platform may authenticate a user of the computing device, wherein the user is authorized to access the enterprise server. At step 315, the computing platform may detect, via the communication interface, voice-based interaction from the authenticated user. At step 320, the computing platform may cause, via the communication interface, the voice-based interaction to be captured as audio data. At step 325, the computing platform may transform the audio data to textual data. At step 330, the computing platform may analyze the textual data to identify a time-sensitive task or a query related to an entity. At step 335, the computing platform may determine if a time-sensitive task or a query is identified. If neither a time-sensitive task nor a query is identified, the process moves to step 315. In some embodiments, as voice-based interactions are detected and processed in real-time, upon a determination that neither a time-sensitive task or a query is identified, the process may proceed to step 325, and/or step 330. If a time-sensitive task or a query is identified, the process moves to step 340. At step 340, the computing platform may generate, based on the identified time-sensitive task or the query, one or more instructions to execute the time-sensitive task or respond to the query. At step 345, the computing platform may send, to the enterprise server and via the communication channel, the one or more instructions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing platform comprising at least one processor, a communication interface, and memory:
establishing, via the communication interface, a communication channel between a computing device and an enterprise server;
authenticating a user of the computing device, wherein the user is authorized to access the enterprise server;
detecting, via the communication interface, voice-based interaction from the authenticated user;
causing, via the communication interface, the voice-based interaction to be captured as audio data;
transforming the audio data to textual data;
analyzing the textual data to identify one or more queries related to an entity;
generating, based on the one or more queries, one or more instructions to respond to the one or more queries;
sending, to the enterprise server and via the communication channel, the one or more instructions;
determining, based on location data, a level of privacy between the user and the computing device; and
establishing, based on the level of privacy, a second communication channel between the enterprise server and a second computing device associated with the user.

2. The method of claim 1, wherein the authenticating the user is based on one or more of biometric identifiers associated with the user.

3. The method of claim 1, wherein the authenticating the user is based on one or more of behavioral identifiers associated with the user.

4. The method of claim 1, wherein the authenticating the user is based on a location data of the computing device, wherein the location data is based on a high generation cellular network.

5. The method of claim 1, wherein the authenticating the user is based on a confidence level associated with the computing device.

6. The method of claim 1, wherein the authenticating the user occurs at periodic intervals of time.

7. The computing platform of claim 1, wherein transforming the audio data to the textual data is based on a trained machine learning model personalized for the user of the computing device.

8. A computing platform, comprising:
at least one processor;
a communication interface communicatively coupled to the at least one processor; and
memory storing computer-readable instructions that, when executed by the at least one processor, cause the computing platform to:
establish, via the communication interface, a communication channel between a computing device and an enterprise server;
authenticate a user of the computing device, wherein the user is authorized to access the enterprise server;
detect, via the communication interface, voice-based interaction from the authenticated user;
cause, via the communication interface, the voice-based interaction to be captured as audio data;
transform the audio data to textual data;
analyze the textual data to identify one or more queries related to an entity;
generate, based on the one or more queries, one or more instructions to respond to the one or more queries;
send, to the enterprise server and via the communication channel, the one or more instructions;
determine, based on location data, a level of privacy between the user and the computing device; and
establish, based on the level of privacy, a second communication channel between the enterprise server and a second computing device associated with the user.

9. The computing platform of claim 8, wherein the computing device is an on-board computing device of a vehicle.

10. The computing platform of claim 9, wherein the communication interface is an on-board graphical user interface associated with the on-board computing device of the vehicle.

11. The computing platform of claim 8, wherein the communication channel is established over a fifth-generation cellular network.

12. The computing platform of claim 8, wherein authenticating the user is based on one or more of biometric identifiers associated with the user.

13. The computing platform of claim 8, wherein authenticating the user is based on one or more of behavioral identifiers associated with the user.

14. The computing platform of claim 8, wherein authenticating the user is based on a location data of the computing device, wherein the location data is based on a high generation cellular network.

15. The computing platform of claim 8, wherein authenticating the user is based on a confidence level associated with the computing device.

16. The computing platform of claim 15, wherein the confidence level is based on a knowledge of a second communication channel established between the computing device and a trusted device associated with the user.

17. The computing platform of claim 8, wherein authenticating the user occurs at periodic intervals of time.

18. The computing platform of claim 8, wherein transforming the audio data to the textual data is based on a trained machine learning model personalized for the user of the computing device.

19. One or more non-transitory computer-readable media storing instructions that, when executed by a computing platform comprising at least one processor, a communication interface, and memory, cause the computing platform to:
   establish, via the communication interface, a communication channel between a computing device and an enterprise server;
   authenticate a user of the computing device, wherein the user is authorized to access the enterprise server;
   detect, via the communication interface, voice-based interaction from the authenticated user;
   cause, via the communication interface, the voice-based interaction to be captured as audio data;
   transform the audio data to textual data;
   analyze the textual data to identify one or more queries related to an entity;
   generate, based on the one or more queries, one or more instructions to respond to the one or more queries;
   send, to the enterprise server and via the communication channel, the one or more instructions;
   determine, based on location data, a level of privacy between the user and the computing device; and
   establish, based on the level of privacy, a second communication channel between the enterprise server and a second computing device associated with the user.

20. A computing platform, comprising:
   at least one processor;
   a communication interface communicatively coupled to the at least one processor; and
   memory storing computer-readable instructions that, when executed by the at least one processor, cause the computing platform to:
     establish, via the communication interface, a communication channel between a computing device and an enterprise server;
     authenticate a user of the computing device, wherein the user is authorized to access the enterprise server, wherein the authenticating the user is based on a confidence level associated with the computing device and wherein the confidence level is based on a knowledge of a second communication channel established between the computing device and a trusted device associated with the user;
     detect, via the communication interface, voice-based interaction from the authenticated user;
     cause, via the communication interface, the voice-based interaction to be captured as audio data;
     transform the audio data to textual data;
     analyze the textual data to identify one or more queries related to an entity;
     generate, based on the one or more queries, one or more instructions to respond to the one or more queries; and
     send, to the enterprise server and via the communication channel, the one or more instructions.

* * * * *